US012757068B2

(12) United States Patent
Li et al.

(10) Patent No.: US 12,757,068 B2
(45) Date of Patent: Oct. 6, 2026

(54) BANDWIDTH DETERMINING METHOD, DEVICE, STORAGE MEDIUM, AND PROGRAM PRODUCT

(71) Applicant: HUAWEI TECHNOLOGIES CO., LTD., Shenzhen (CN)

(72) Inventors: Yunbo Li, Shenzhen (CN); Jian Yu, Shenzhen (CN); Ming Gan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 495 days.

(21) Appl. No.: 18/465,767

(22) Filed: Sep. 12, 2023

(65) Prior Publication Data

US 2023/0422091 A1 Dec. 28, 2023

Related U.S. Application Data

(63) Continuation of application No. PCT/CN2022/080172, filed on Mar. 10, 2022.

(30) Foreign Application Priority Data

Mar. 12, 2021 (CN) ......................... 202110272545.8

(51) Int. Cl.
*H04W 28/04* (2009.01)
*H04L 1/00* (2006.01)
*H04W 28/20* (2009.01)

(52) U.S. Cl.
CPC ........... *H04W 28/04* (2013.01); *H04L 1/0038* (2013.01); *H04L 1/0061* (2013.01); *H04W 28/20* (2013.01)

(58) Field of Classification Search
CPC ..... H04W 28/04; H04W 28/20; H04W 84/12; H04W 72/0453; H04W 72/0457;
(Continued)

(56) References Cited

U.S. PATENT DOCUMENTS 11,330,465 B2 * 5/2022 Xin ....................... H04W 28/06
2015/0146808 A1 * 5/2015 Chu ...................... H04L 5/0094
375/260
(Continued)

FOREIGN PATENT DOCUMENTS

CN 110621043 A 12/2019
CN 112469088 A 3/2021
(Continued)

OTHER PUBLICATIONS

Office Action in Korean Appln. No. 2023-7034507, mailed on Aug. 28, 2025, 10 pages (with English translation).
(Continued)

*Primary Examiner* — Abdullahi Ahmed
(74) *Attorney, Agent, or Firm* — Fish & Richardson P.C.

(57) ABSTRACT

An example bandwidth determining method, including: a first device receives a physical layer protocol data unit (PPDU) from a second device, where the PPDU comprises a scrambling sequence and a service field, and a first group of bits in the scrambling sequence and a second group of bits in the service field indicate at least one candidate bandwidth. Then, in response to detecting a check error occurs in the second group of bits, the first device determines a bandwidth for communication between the first device and the second device based on the first group of bits.

20 Claims, 7 Drawing Sheets

(58) Field of Classification Search
CPC ... H04L 1/0038; H04L 1/0061; H04L 5/0096; Y02D 30/70
See application file for complete search history.

(56) References Cited

U.S. PATENT DOCUMENTS

| | | | | |
|---|---|---|---|---|
| 2015/0296454 | A1 | 10/2015 | Lee et al. | |
| 2015/0312386 | A1 | 10/2015 | Lee et al. | |
| 2017/0064711 | A1* | 3/2017 | Choi | H04W 74/04 |
| 2021/0336720 | A1* | 10/2021 | Chu | H04W 28/20 |
| 2021/0400727 | A1* | 12/2021 | Lu | H04W 74/0816 |
| 2021/0410188 | A1* | 12/2021 | Yang | H04L 27/2617 |
| 2022/0053379 | A1* | 2/2022 | Sun | H04W 28/20 |
| 2022/0201665 | A1* | 6/2022 | Lu | H04L 5/0094 |
| 2022/0247515 | A1* | 8/2022 | Hart | H04L 1/0068 |
| 2024/0172273 | A1* | 5/2024 | Chang | H04W 74/006 |

FOREIGN PATENT DOCUMENTS

| | | | |
|---|---|---|---|
| JP | 2013533680 | A | 8/2013 |
| JP | 2013541293 | A | 11/2013 |
| KR | 20160019483 | A | 2/2016 |

OTHER PUBLICATIONS

Office Action in Australian Appln. No. 2022-235126, mailed on May 16, 2025, 3 pages.

IEEE P802.11be/D0.1, "Draft Standard for Information technology, Tele communications and information exchange between systems Local and metropolitan area networks, Specific requirements, Part 11: Wireless LAN Medium Access Control (MAC) and Physical Layer (PHY) Specifications, Amendment 8: Enhancements for extremely high throughput (EHT)," Sep. 2020, 299 pages.

IEEE Std 802.11a-1999, "Supplement to IEEE Standard for Information technology, Telecommunications and information exchange between systems, Local and metropolitan area networks, Specific requirements, Part 11: Wireless LAN Medium Access Control (MAC) and Physical Layer (PHY) specifications: High-speed Physical Layer in the 5 GHZ Band," Sep. 16, 1999, 90 pages.

IEEE P802.11ac/D7.0, "Draft STANDARD for Information Technology, Telecommunications and information exchange between systems, Local and metropolitan area networks, Specific requirements, Part 11: Wireless LAN Medium Access Control (MAC) and Physical Layer (PHY) specifications, Amendment 4: Enhancements for Very High Throughput for Operation in Bands below 6 GHz," Sep. 2013, 456 pages.

International Search Report and Written Opinion in International Appln. No. PCT/CN2022/080172, mailed on May 30, 2022, 16 pages (with English translation).

Li, "Proposed Draft Specification for WideBand BW Signaling" IEEE 802.11-21/0077r1, Jan. 11, 2021, 6 pages.

Li et al., "Proposed Draft Specification for WideBand BW Signaling" IEEE 802.11-21/0494r0, Mar. 4, 2021, 13 pages.

Office Action in Japanese Appln. No. 2023-555760, mailed on Oct. 15, 2024, 5 pages (with English translation).

* cited by examiner

400

| B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|
| 0 | 0 | 0 | 0 | 0 | 0 | 0 | 0/1 | 0 | 0 | P | 0 | 0 | 0 | 0 | 0 |

BANDWIDTH DETERMINING METHOD, DEVICE, STORAGE MEDIUM, AND PROGRAM PRODUCT

CROSS-REFERENCE TO RELATED APPLICATIONS

This application is a continuation of International Application No. PCT/CN2022/080172, filed on Mar. 10, 2022, which claims priority to Chinese Patent Application No. 202110272545.8, filed on Mar. 12, 2021. The disclosures of the aforementioned applications are herein incorporated by reference in their entireties.

TECHNICAL FIELD

Embodiments of this disclosure mainly relate to the communication field, and in particular, to a bandwidth determining method, a device, a storage medium, and a program product.

BACKGROUND

In a wireless local area network, a transmit end and a receive end are in different wireless channel environments. Before the transmit end and the receive end perform data communication, it is expected that a bandwidth suitable for communication between the two parties can be obtained through negotiation based on channel availability statuses of the two parties. In addition, in a communication process, a corresponding frame and a trigger frame of the corresponding frame usually need to use a same bandwidth.

In an existing solution, to perform such negotiation, the transmit end may send a channel bandwidth to the receive end during data communication. For example, the transmit end may use a group of bits in a scrambling sequence and a group of bits in a service field to jointly indicate the bandwidth.

SUMMARY

An embodiment of this disclosure provides a bandwidth determining solution.

A first aspect of this disclosure provides a bandwidth determining method. The method includes: A first device receives a physical layer protocol data unit PPDU from a second device, where the PPDU is used to determine a scrambling sequence and a service field, and a first group of bits in the scrambling sequence and a second group of bits in the service field indicate a bandwidth; and if a check error occurs in the second group of bits, determines a bandwidth for communication between the first device and the second device based on the first group of bits.

In this specification, the PPDU received by the first device may carry a control frame or a management frame. In some embodiments of the first aspect, the received PPDU is a PPDU in a non-high throughput non-HT format or a PPDU in a non-high throughput duplicated non-HT duplicated format. An example of the carried control frame includes but is not limited to an RTS (request to send) frame, a CTS (clear to send) frame, a PS-Poll (power-saving poll) frame, a CF-End (contention-free end) frame, a BAR (block acknowledgment request) frame, or an NDP announcement (null data PPDU announcement) frame.

In this specification, the first group of bits and/or the second group of bits may include one or more bits. For example, the first group of bits may include bits B5 and B6 in the scrambling sequence, and the second group of bits may include a bit B7 in the service field.

Different values of the first group of bits and the second group of bits may indicate different bandwidths. A size of the bandwidth may include, for example, 20 MHz, 40 MHz, 80 MHz, 160 (80+80) MHz, 320 MHz, or 480 MHz.

According to the solution of this disclosure, when the check error occurs in the second group of bits, the first device does not simply discard the frame, but can continue to attempt to determine the bandwidth for communication based on the first group of bits. Based on this manner, the solution of this disclosure can reduce unnecessary retransmission or channel contention, save valuable air interface resources, and improve system efficiency.

In some embodiments of the first aspect, the determining a bandwidth for communication between the first device and the second device based on the first group of bits includes: if the first group of bits indicate a single candidate bandwidth, determining the single candidate bandwidth as the bandwidth for communication.

In some embodiments of the first aspect, the determining a bandwidth for communication between the first device and the second device based on the first group of bits includes: if a value of the first group of bits is 1, it indicates that the bandwidth for communication is a first bandwidth; if a value of the first group of bits is 2, it indicates that the bandwidth for communication is a second bandwidth; or if a value of the first group of bits is 3, it indicates that the bandwidth for communication is a third bandwidth.

In some embodiments of the first aspect, the first bandwidth is 40 MHz, the second bandwidth is 80 MHz, and the third bandwidth is 160 MHz.

For example, B5, B6, and B7 described above indicate bandwidth modes, and the three bits can indicate a maximum of eight types of bandwidths. Currently, commonly used bandwidths mainly include 20 MHz, 40 MHz, 80 MHz, 160 (80+80) MHz, and 320 MHz. For example, if B5B6 is 0 and B7 is 0, it indicates 20 MHz; if B5B6 is 1 and B7 is 0, it indicates 40 MHz; if B5B6 is 2 and B7 is 0, it indicates 80 MHz; if B5B6 is 3 and B7 is 0, it indicates 160 MHz; if B5B6 is 0 and B7 is 1, it indicates 320 MHz; or if B5B6 is 1, 2, or 3, and B7 is 1, it may indicate a reserved bandwitdth, that is, no bandwidth is temporarily indicated. In a protocol, a sequence that a least significant bit is sent first is used. For example, if B5B6 is 2, a corresponding binary number is 10. In this case, B5=0 and B6=1.

In this example, when B5B6 is 1, 2, or 3, it can indicate a single corresponding bandwidth. For example, when B5B6 is 1, it indicates 40 MHz; when B5B6 is 2, it indicates 80 MHz; or when B5B6 is 3, it indicates 160 MHz. In this case, even if a check error occurs in B7, the first device can also determine the bandwidth for communication based on a unique bandwidth corresponding to B5B6.

In some embodiments of the first aspect, the determining a bandwidth for communication between the first device and the second device based on the first group of bits includes: if the first group of bits indicate a plurality of candidate bandwidths, determining the bandwidth for communication from the plurality of candidate bandwidths based on a bandwidth negotiation process between the first device and the second device.

In this specification, the bandwidth negotiation process indicates whether bandwidth negotiation is accepted between the first device and the second device. The bandwidth negotiation process may include a dynamic bandwidth negotiation process. The dynamic bandwidth negotiation process is as follows: When sending an RTS frame, a station that supports dynamic bandwidth negotiation sets B4 (indicating DYN_BANDWIDTH_IN_NON_HT) in the first seven bits of the scrambling sequence to 1 (indicating a dynamic mode); and after a receive station receives the RTS frame, if a NAV (network allocation vector) indicates idle, and a candidate bandwidth less than or equal to a bandwidth of the RTS frame meets the following condition, the receive station sends a CTS (clear to send) frame by using the candidate bandwidth. Otherwise, no CTS is returned. The condition that needs to be met is that a detection result of CCA (clear channel assessment) for a secondary channel of the candidate bandwidth is idle within a PIFS (point coordination function interframe space) time before the RTS is sent.

The bandwidth negotiation process may include a static bandwidth negotiation process. The static bandwidth negotiation process is as follows: When sending an RTS frame, a station that does not support dynamic bandwidth negotiation sets B4 (indicating DYN_BANDWIDTH_IN_NON_HT) in the first seven bits of the scrambling sequence to 0 (indicating a static mode); and after a receive station receives the RTS frame, if a NAV indicates idle, and a bandwidth of the RTS frame meets the following condition, the receive station sends a CTS frame by using a same bandwidth as that of the RTS frame. Otherwise, no CTS is returned. The condition that needs to be met is that a detection result of CCA for a secondary channel of the RTS bandwidth is idle within a PIFS time before the RTS is sent.

The bandwidth negotiation process may further include a bandwidth negotiation-free process. The bandwidth negotiation-free process is as follows: When a station sends a non-HT or non-HT PPDU that carries content that is not an RTS frame, a DYN_BANDWIDTH_IN_NON_HT indication is not used, in other words, B4 in the first seven bits of the scrambling sequence may be randomly generated on the premise that the first seven bits of the scrambling sequence are not all 0s. In this case, a receive station is to return a response frame by using a same bandwidth as that of the received frame.

In some embodiments of the first aspect, the bandwidth negotiation process is determined depending on whether the PPDU indicates a preset parameter (for example, DYN_BANDWIDTH_IN_NON_HT) or based on a value of a preset parameter indicated by the PPDU. For example, when the parameter DYN_BANDWIDTH_IN_NON_HT is not indicated in the PPDU, it may be determined that the bandwidth negotiation process is the bandwidth negotiation-free process; when the parameter DYN_BANDWIDTH_IN_ NON_HT is indicated as 0 in the PPDU, it may be determined that the bandwidth negotiation process is the static bandwidth negotiation process; or when the parameter DYN_BANDWIDTH_IN_NON_HT is indicated as 1 in the PPDU, it may be determined that the bandwidth negotiation process is the dynamic bandwidth negotiation process.

In some embodiments of the first aspect, the determining the bandwidth for communication from the plurality of candidate bandwidths includes: if the bandwidth negotiation process is the dynamic bandwidth negotiation process, selecting a smallest candidate bandwidth from the plurality of candidate bandwidths.

For example, when B5B6 in the scrambling sequence is 0 and B7 is 0, it indicates 20 MHz; or when B5B6 is 0 and B7 is 1, it indicates 320 MHz. That is, when B5B6 is 0, it indicates two possible bandwidths. In this case, if the bandwidth negotiation process is the dynamic bandwidth negotiation process, the first device may select a smaller bandwidth from the two possible bandwidths. Based on this manner, direct discarding of the PPDU can be avoided, and system efficiency can be improved.

In some embodiments of the first aspect, the determining the bandwidth for communication from the plurality of candidate bandwidths includes: if the bandwidth negotiation process is a non-dynamic bandwidth negotiation process, determining the bandwidth for communication from the plurality of candidate bandwidths through blind detection, where the non-dynamic bandwidth negotiation process includes the static bandwidth negotiation process or the bandwidth negotiation-free process.

For example, through blind detection, the bandwidth may be autonomously determined with reference to information obtained from the PPDU. For example, in a process of receiving the PPDU, an EHT (very high throughput) receive station records received signal strength on each 20 MHz sub-channel within 320 MHz, performs cross-correlation on receive signals on each 20 MHz sub-channel, or separately performs frame header synchronization on each 20 MHz sub-channel. In this way, it is determined whether there is a received signal only in primary 20 MHz or there is a received signal in each 20 MHz within 320 MHz. Based on this manner, for example, when B5B6 is 0, it indicates 20 MHz and 320 MHz. In this case, the first device may distinguish, through blind detection, whether a current bandwidth is 20 MHz or 320 MHz.

A second aspect of this disclosure provides a bandwidth determining method. The method includes: A first device receives a physical layer protocol data unit PPDU from a second device, where the PPDU is used to determine a group of bits that are associated with a bandwidth and that are in a service field; and if a check error occurs in the group of bits, determines a bandwidth for communication between the first device and the second device based on a bandwidth negotiation process between the first device and the second device.

In this specification, the PPDU received by the first device may carry a control frame or a management frame. In some embodiments of the second aspect, the received PPDU is a PPDU in a non-high throughput non-HT format or a PPDU in a non-high throughput duplicated non-HT duplicated format. An example of the carried control frame includes but is not limited to an RTS (request to send) frame, a CTS (clear to send) frame, a PS-Poll (power-saving poll) frame, a CF-End (contention-free end) frame, a BAR (block acknowledgment request) frame, or an NDP announcement (null data PPDU announcement) frame. In this specification, the group of bits in the service field may include one or more bits. For example, the group of bits may include a seventh bit B7 in the service field.

In this specification, the bandwidth negotiation process indicates whether bandwidth negotiation is accepted between the first device and the second device. The bandwidth negotiation process may include a dynamic bandwidth negotiation process. The dynamic bandwidth negotiation process is as follows: When sending an RTS frame, a station that supports dynamic bandwidth negotiation sets B4 (indicating DYN_BANDWIDTH_IN_NON_HT) in the first seven bits of a scrambling sequence to 1 (indicating a dynamic mode); and after a receive station receives the RTS frame, if a NAV (network allocation vector) indicates idle, and a candidate bandwidth less than or equal to a bandwidth of the RTS frame meets the following condition, the receive station sends a CTS (clear to send) frame by using the candidate bandwidth. Otherwise, no CTS is returned. The condition that needs to be met is that a detection result of CCA (clear channel assessment) for a secondary channel of the candidate bandwidth is idle within a PIFS (point coordination function interframe space) time before the RTS is sent.

The bandwidth negotiation process may include a static bandwidth negotiation process. The static bandwidth negotiation process is as follows: When sending an RTS frame, a station that does not support dynamic bandwidth negotiation sets B4 (indicating DYN_BANDWIDTH_IN_NON_HT) in the first seven bits of a scrambling sequence to 0 (indicating a static mode); and after a receive station receives the RTS frame, if a NAV indicates idle, and a bandwidth of the RTS frame meets the following condition, the receive station sends a CTS frame by using a same bandwidth as that of the RTS frame. Otherwise, no CTS is returned. The condition that needs to be met is that a detection result of CCA for a secondary channel of the RTS bandwidth is idle within a PIFS time before the RTS is sent.

The bandwidth negotiation process may further include a bandwidth negotiation-free process. The bandwidth negotiation-free process is as follows: When a station sends a non-HT or non-HT PPDU that carries content that is not an RTS frame, a DYN_BANDWIDTH_IN_NON_HT indication is not used, in other words, B4 in the first seven bits of a scrambling sequence may be randomly generated on the premise that the first seven bits of the scrambling sequence are not all 0s. In this case, a receive station is to return a response frame by using a same bandwidth as that of the received frame.

According to the solution of this disclosure, when the check error occurs in the group of bits in the service field, the first device does not simply discard the PPDU, but can continue to attempt to determine the bandwidth for communication based on the bandwidth negotiation process. Based on this manner, the solution of this disclosure can reduce unnecessary retransmission or channel contention, save valuable air interface resources, and improve system efficiency.

In some embodiments of the second aspect, the bandwidth negotiation process is determined depending on whether the PPDU indicates a preset parameter (for example, DYN_BANDWIDTH_IN_NON_HT) or based on a value of a preset parameter indicated by the PPDU. For example, when the parameter DYN_BANDWIDTH_IN_NON_HT is not indicated in the PPDU, it may be determined that the bandwidth negotiation process is the bandwidth negotiation-free process; when the parameter DYN_BANDWIDTH_IN _NON_HT is indicated as 0 in the PPDU, it may be determined that the bandwidth negotiation process is the static bandwidth negotiation process; or when the parameter DYN_BANDWIDTH_IN_NON_HT is indicated as 1 in the PPDU, it may be determined that the bandwidth negotiation process is the dynamic bandwidth negotiation process.

In some embodiments of the second aspect, the determining a bandwidth for communication between the first device and the second device includes: if the bandwidth negotiation process is the dynamic bandwidth negotiation process, determining a preset bandwidth as the bandwidth for communication. In some embodiments of the second aspect, the preset bandwidth is 20 MHz. In this manner, according to embodiments of this disclosure, the bandwidth can be determined more simply and efficiently.

In some embodiments of the second aspect, the group of bits are a third group of bits, the PPDU is further used to determine a fourth group of bits in the scrambling sequence, and the third group of bits and the fourth group of bits indicate a bandwidth. The determining a bandwidth for communication between the first device and the second device includes: determining the bandwidth for communication based on the bandwidth negotiation process and the fourth group of bits.

In some embodiments of the second aspect, the determining the bandwidth for communication based on the bandwidth negotiation process and the fourth group of bits includes: if the fourth group of bits indicate a plurality of candidate bandwidths, determining the bandwidth for communication from the plurality of candidate bandwidths based on the bandwidth negotiation process.

In some embodiments of the second aspect, if the fourth group of bits indicate a single candidate bandwidth, the first device may determine the single candidate bandwidth as the bandwidth for communication.

In some embodiments of the second aspect, the determining the bandwidth for communication from the plurality of candidate bandwidths based on the bandwidth negotiation process includes: if the bandwidth negotiation process is the dynamic bandwidth negotiation process, selecting a smallest candidate bandwidth from the plurality of candidate bandwidths.

For example, when B5B6 in the scrambling sequence is 0 and B7 in the service field is 0, it indicates 20 MHz; or when B5B6 is 0 and B7 is 1, it indicates 320 MHz. That is, when B5B6 is 0, it indicates two possible bandwidths. In this case, if the bandwidth negotiation process is the dynamic bandwidth negotiation process, the first device may select a smaller bandwidth from the two possible bandwidths. Based on this manner, direct discarding of the PPDU can be avoided, and system efficiency can be improved.

In some embodiments of the second aspect, the determining the bandwidth for communication from the plurality of candidate bandwidths based on the bandwidth negotiation process includes: if the bandwidth negotiation process is a non-dynamic bandwidth negotiation process, determining the bandwidth for communication from the plurality of candidate bandwidths through blind detection, where the non-dynamic bandwidth negotiation process includes the static bandwidth negotiation process or the bandwidth negotiation-free process.

For example, through blind detection, the bandwidth may be autonomously determined with reference to information obtained from the PPDU. For example, in a process of receiving the PPDU, an EHT (very high throughput) receive station records received signal strength on each 20 MHz sub-channel within 320 MHz, performs cross-correlation on receive channels on each 20 MHz sub-channel, or separately performs frame header synchronization on each 20 MHz sub-channel. In this way, it is determined whether there is a received signal only in primary 20 MHz or there is a received signal in each 20 MHz within 320 MHz. Based on this manner, for example, when B5B6 is 0, it indicates 20 MHz or 320 MHz. In this case, the first device may distinguish, through blind detection, whether a current bandwidth is 20 MHz or 320 MHz.

In some embodiments of the second aspect, the bandwidth negotiation process is determined depending on whether the PPDU indicates a preset parameter or based on a value of a preset parameter indicated by the PPDU.

In some embodiments of the second aspect, the PPDU is a PPDU in a non-high throughput non-HT format or a PPDU in a non-high throughput duplicated non-HT duplicated format.

A third aspect of this disclosure provides a first device. The first device includes: a receiving unit, configured to receive a physical layer protocol data unit PPDU from a second device, where the PPDU is used to determine a scrambling sequence and a service field, and a first group of bits in the scrambling sequence and a second group of bits in the service field indicate a bandwidth; and a processing unit, configured to: if a check error occurs in the second group of bits, determine a bandwidth for communication between the first device and the second device based on the first group of bits.

In some embodiments of the third aspect, the processing unit is further configured to: if the first group of bits indicate a single candidate bandwidth, determine the single candidate bandwidth as the bandwidth for communication.

In some embodiments of the third aspect, if a value of the first group of bits is 1, it indicates that the bandwidth for communication is a first bandwidth; if a value of the first group of bits is 2, it indicates that the bandwidth for communication is a second bandwidth; or if a value of the first group of bits is 3, it indicates that the bandwidth for communication is a third bandwidth.

In some embodiments of the third aspect, the first bandwidth is 40 MHz, the second bandwidth is 80 MHz, and the third bandwidth is 160 MHz.

In some embodiments of the third aspect, the processing unit is further configured to: if the first group of bits indicate a plurality of candidate bandwidths, determine the bandwidth for communication from the plurality of candidate bandwidths based on a bandwidth negotiation process between the first device and the second device.

In some embodiments of the third aspect, the bandwidth negotiation process is determined depending on whether the PPDU indicates a preset parameter (for example, DYN_BANDWIDTH_IN_NON_HT) or based on a value of a preset parameter indicated by the PPDU. For example, when the parameter DYN_BANDWIDTH_IN_NON_HT is not indicated in the PPDU, it may be determined that the bandwidth negotiation process is a bandwidth negotiation-free process; when the parameter DYN_BANDWIDTH_IN_ NON_HT is indicated as 0 in the PPDU, it may be determined that the bandwidth negotiation process is a static bandwidth negotiation process; or when the parameter DYN_BANDWIDTH_IN_NON_HT is indicated as 1 in the PPDU, it may be determined that the bandwidth negotiation process is a dynamic bandwidth negotiation process.

In some embodiments of the third aspect, the processing unit is further configured to: if the bandwidth negotiation process is the dynamic bandwidth negotiation process, select a smallest candidate bandwidth from the plurality of candidate bandwidths.

In some embodiments of the third aspect, the processing unit is further configured to: if the bandwidth negotiation process is a non-dynamic bandwidth negotiation process, determine the bandwidth for communication from the plurality of candidate bandwidths through blind detection, where the non-dynamic bandwidth negotiation process includes the static bandwidth negotiation process or the bandwidth negotiation-free process.

In some embodiments of the third aspect, the PPDU is a PPDU in a non-high throughput non-HT format or a PPDU in a non-high throughput duplicated non-HT duplicated format.

A fourth aspect of this disclosure provides a first device. The first device includes: a receiving unit, configured to receive a physical layer protocol data unit PPDU from a second device, where the PPDU is used to determine a group of bits that are associated with a bandwidth and that are in a service field; and a processing unit, configured to: if a check error occurs in the group of bits, determine a bandwidth for communication between the apparatus and the second device based on a bandwidth negotiation process between the first device and the second device.

In some embodiments of the fourth aspect, the processing unit is further configured to: if the bandwidth negotiation process is a dynamic bandwidth negotiation process, determine a preset bandwidth as the bandwidth for communication.

In some embodiments of the fourth aspect, the preset bandwidth is 20 MHz.

In some embodiments of the fourth aspect, the group of bits are a third group of bits, the PPDU is further used to determine a fourth group of bits in a scrambling sequence, and the third group of bits and the fourth group of bits indicate a bandwidth. The processing unit is further configured to determine the bandwidth for communication based on the bandwidth negotiation process and the fourth group of bits.

In some embodiments of the fourth aspect, the processing unit is further configured to: if the fourth group of bits indicate a plurality of candidate bandwidths, determine the bandwidth for communication from the plurality of candidate bandwidths based on the bandwidth negotiation process.

In some embodiments of the fourth aspect, if the fourth group of bits indicate a single candidate bandwidth, the first device may determine the single candidate bandwidth as the bandwidth for communication.

In some embodiments of the fourth aspect, the processing unit is further configured to: if the bandwidth negotiation process is a dynamic bandwidth negotiation process, select a smallest candidate bandwidth from the plurality of candidate bandwidths.

In some embodiments of the fourth aspect, the processing unit is further configured to: if the bandwidth negotiation process is a non-dynamic bandwidth negotiation process, determine the bandwidth for communication from the plurality of candidate bandwidths through blind detection, where the non-dynamic bandwidth negotiation process includes a static bandwidth negotiation process or a bandwidth negotiation-free process.

In some embodiments of the fourth aspect, the bandwidth negotiation process is determined depending on whether the PPDU indicates a preset parameter or based on a value of a preset parameter indicated by the PPDU.

In some embodiments of the fourth aspect, the PPDU is a PPDU in a non-high throughput non-HT format or a PPDU in a non-high throughput duplicated non-HT duplicated format.

A fifth aspect of this disclosure provides a first device. The first device includes a transceiver and a processor. The transceiver is configured to receive a PPDU from a second device, where the PPDU is used to determine a scrambling sequence and a service field, and a first group of bits in the scrambling sequence and a second group of bits in the service field indicate a bandwidth. The processor is configured to: if a check error occurs in the second group of bits, determine a bandwidth for communication between the first device and the second device based on the first group of bits. Optionally, the first device further includes a memory. The memory is configured to store instructions executed by the processor. When the instructions are executed by the processor, if the check error occurs in the second group of bits, the processor can determine the bandwidth for communication between the first device and the second device based on the first group of bits.

In some embodiments of the fifth aspect, the processor is further configured to: if the first group of bits indicate a single candidate bandwidth, determine the single candidate bandwidth as the bandwidth for communication.

In some embodiments of the fifth aspect, if a value of the first group of bits is 1, it indicates that the bandwidth for communication is a first bandwidth; if a value of the first group of bits is 2, it indicates that the bandwidth for communication is a second bandwidth; or if a value of the first group of bits is 3, it indicates that the bandwidth for communication is a third bandwidth.

In some embodiments of the fifth aspect, the first bandwidth is 40 MHz, the second bandwidth is 80 MHz, and the third bandwidth is 160 MHz.

In some embodiments of the fifth aspect, the processor is further configured to: if the first group of bits indicate a plurality of candidate bandwidths, determine the bandwidth for communication from the plurality of candidate bandwidths based on a bandwidth negotiation process between the first device and the second device.

In some embodiments of the fifth aspect, the bandwidth negotiation process is determined depending on whether the PPDU indicates a preset parameter (for example, DYN_BANDWIDTH_IN_NON_HT) or based on a value of a preset parameter indicated by the PPDU. For example, when the parameter DYN_BANDWIDTH_IN_NON_HT is not indicated in the PPDU, it may be determined that the bandwidth negotiation process is a bandwidth negotiation-free process; when the parameter DYN_BANDWIDTH_IN_ NON_HT is indicated as 0 in the PPDU, it may be determined that the bandwidth negotiation process is a static bandwidth negotiation process; or when the parameter DYN_BANDWIDTH_IN_NON_HT is indicated as 1 in the PPDU, it may be determined that the bandwidth negotiation process is a dynamic bandwidth negotiation process.

In some embodiments of the fifth aspect, the processor is further configured to: if the bandwidth negotiation process is the dynamic bandwidth negotiation process, select a smallest candidate bandwidth from the plurality of candidate bandwidths.

In some embodiments of the fifth aspect, the processor is further configured to: if the bandwidth negotiation process is a non-dynamic bandwidth negotiation process, determine the bandwidth for communication from the plurality of candidate bandwidths through blind detection, where the non-dynamic bandwidth negotiation process includes the static bandwidth negotiation process or the bandwidth negotiation-free process.

In some embodiments of the fifth aspect, the PPDU is a PPDU in a non-high throughput non-HT format or a PPDU in a non-high throughput duplicated non-HT duplicated format.

A sixth aspect of this disclosure provides a first device. The first device includes a transceiver and a processor. The receiver is configured to receive a PPDU from a second device, where the PPDU is used to determine a group of bits that are associated with a bandwidth and that are in a service field. The processor is configured to: if a check error occurs in the group of bits, determine a bandwidth for communication between the first device and the second device based on a bandwidth negotiation process between the first device and the second device. Optionally, the first device further includes a memory. The memory is configured to store instructions executed by the processor. When the instructions are executed by the processor, if the check error occurs in the group of bits, the processor can determine the bandwidth for communication between the first device and the second device based on the bandwidth negotiation process between the first device and the second device.

In some embodiments of the sixth aspect, the processor is further configured to: if the bandwidth negotiation process is a dynamic bandwidth negotiation process, determine a preset bandwidth as the bandwidth for communication.

In some embodiments of the sixth aspect, the preset bandwidth is 20 MHz.

In some embodiments of the sixth aspect, the group of bits are a third group of bits, the PPDU is further used to determine a fourth group of bits in a scrambling sequence, and the third group of bits and the fourth group of bits indicate a bandwidth. The processing unit is further configured to determine the bandwidth for communication based on the bandwidth negotiation process and the fourth group of bits.

In some embodiments of the sixth aspect, the processor is further configured to: if the fourth group of bits indicate a plurality of candidate bandwidths, determine the bandwidth for communication from the plurality of candidate bandwidths based on the bandwidth negotiation process.

In some embodiments of the sixth aspect, if the fourth group of bits indicate a single candidate bandwidth, the first device may determine the single candidate bandwidth as the bandwidth for communication.

In some embodiments of the sixth aspect, the processor is further configured to: if the bandwidth negotiation process is a dynamic bandwidth negotiation process, select a smallest candidate bandwidth from the plurality of candidate bandwidths.

In some embodiments of the sixth aspect, the processor is further configured to: if the bandwidth negotiation process is a non-dynamic bandwidth negotiation process, determine the bandwidth for communication from the plurality of candidate bandwidths through blind detection, where the non-dynamic bandwidth negotiation process includes a static bandwidth negotiation process or a bandwidth negotiation-free process.

In some embodiments of the sixth aspect, the bandwidth negotiation process is determined depending on whether the PPDU indicates a preset parameter or based on a value of a preset parameter indicated by the PPDU.

In some embodiments of the sixth aspect, the PPDU is a PPDU in a non-high throughput non-HT format or a PPDU in a non-high throughput duplicated non-HT duplicated format.

A seventh aspect of this disclosure provides a first device, including an input interface and a processing circuit. The input interface is configured to receive a PPDU from a second device, where the PPDU is used to determine a scrambling sequence and a service field, and a first group of bits in the scrambling sequence and a second group of bits in the service field indicate a bandwidth. The processing circuit is configured to: if a check error occurs in the second group of bits, determine a bandwidth for communication between the first device and the second device based on the first group of bits.

In some embodiments of the seventh aspect, the processing circuit is further configured to: if the first group of bits indicate a single candidate bandwidth, determine the single candidate bandwidth as the bandwidth for communication.

In some embodiments of the seventh aspect, if a value of the first group of bits is 1, it indicates that the bandwidth for communication is a first bandwidth; if a value of the first group of bits is 2, it indicates that the bandwidth for communication is a second bandwidth; or if a value of the first group of bits is 3, it indicates that the bandwidth for communication is a third bandwidth.

In some embodiments of the seventh aspect, the first bandwidth is 40 MHz, the second bandwidth is 80 MHz, and the third bandwidth is 160 MHz.

In some embodiments of the seventh aspect, the processing circuit is further configured to: if the first group of bits indicate a plurality of candidate bandwidths, determine the bandwidth for communication from the plurality of candidate bandwidths based on a bandwidth negotiation process between the first device and the second device.

In some embodiments of the seventh aspect, the bandwidth negotiation process is determined depending on whether the PPDU indicates a preset parameter (for example, DYN_BANDWIDTH_IN_NON_HT) or based on a value of a preset parameter indicated by the PPDU. For example, when the parameter DYN_BANDWIDTH_IN_NON_HT is not indicated in the PPDU, it may be determined that the bandwidth negotiation process is a bandwidth negotiation-free process; when the parameter DYN_BANDWIDTH_IN_NON_HT is indicated as 0 in the PPDU, it may be determined that the bandwidth negotiation process is a static bandwidth negotiation process; or when the parameter DYN_BANDWIDTH_IN_NON_HT is indicated as 1 in the PPDU, it may be determined that the bandwidth negotiation process is a dynamic bandwidth negotiation process.

In some embodiments of the seventh aspect, the processing circuit is further configured to: if the bandwidth negotiation process is the dynamic bandwidth negotiation process, select a smallest candidate bandwidth from the plurality of candidate bandwidths.

An eighth aspect of this disclosure provides a first device. The first device includes an input interface and a processing circuit. The input interface is configured to receive a PPDU from a second device, where the PPDU is used to determine a group of bits that are associated with a bandwidth and that are in a service field. The processing circuit is configured to: if a check error occurs in the group of bits, determine a bandwidth for communication between the first device and the second device based on a bandwidth negotiation process between the first device and the second device.

In some embodiments of the eighth aspect, the processing circuit is further configured to: if the bandwidth negotiation process is a dynamic bandwidth negotiation process, determine a preset bandwidth as the bandwidth for communication.

In some embodiments of the eighth aspect, the preset bandwidth is 20 MHz.

In some embodiments of the eighth aspect, the group of bits are a third group of bits, the PPDU is further used to determine a fourth group of bits in a scrambling sequence, and the third group of bits and the fourth group of bits indicate a bandwidth. The processing unit is further configured to determine the bandwidth for communication based on the bandwidth negotiation process and the fourth group of bits.

In some embodiments of the eighth aspect, the processing circuit is further configured to: if the fourth group of bits indicate a plurality of candidate bandwidths, determine the bandwidth for communication from the plurality of candidate bandwidths based on the bandwidth negotiation process.

In some embodiments of the eighth aspect, if the fourth group of bits indicate a single candidate bandwidth, the first device may determine the single candidate bandwidth as the bandwidth for communication.

In some embodiments of the eighth aspect, the processing circuit is further configured to: if the bandwidth negotiation process is a dynamic bandwidth negotiation process, select a smallest candidate bandwidth from the plurality of candidate bandwidths.

In some embodiments of the eighth aspect, the processing circuit is further configured to: if the bandwidth negotiation process is a non-dynamic bandwidth negotiation process, determine the bandwidth for communication from the plurality of candidate bandwidths through blind detection, where the non-dynamic bandwidth negotiation process includes a static bandwidth negotiation process or a bandwidth negotiation-free process.

In some embodiments of the eighth aspect, the bandwidth negotiation process is determined depending on whether the PPDU indicates a preset parameter or based on a value of a preset parameter indicated by the PPDU.

In some embodiments of the eighth aspect, the PPDU is a PPDU in a non-high throughput non-HT format or a PPDU in a non-high throughput duplicated non-HT duplicated format.

A ninth aspect of this disclosure provides a computer-readable storage medium. The computer-readable storage medium stores one or more computer instructions, and the one or more computer instructions are used by a processor to perform a method. The method includes: A first device receives a PPDU from a second device, where the PPDU is used to determine a scrambling sequence and a service field, and a first group of bits in the scrambling sequence and a second group of bits in the service field indicate a bandwidth; and if a check error occurs in the second group of bits, determines a bandwidth for communication between the first device and the second device based on the first group of bits.

In some embodiments of the ninth aspect, the determining a bandwidth for communication between the first device and the second device based on the first group of bits includes: if the first group of bits indicate a single candidate bandwidth, determining the single candidate bandwidth as the bandwidth for communication.

In some embodiments of the ninth aspect, the determining a bandwidth for communication between the first device and the second device based on the first group of bits includes: if a value of the first group of bits is 1, it indicates that the bandwidth for communication is a first bandwidth; if a value of the first group of bits is 2, it indicates that the bandwidth for communication is a second bandwidth; or if a value of the first group of bits is 3, it indicates that the bandwidth for communication is a third bandwidth.

In some embodiments of the ninth aspect, the first bandwidth is 40 MHz, the second bandwidth is 80 MHz, and the third bandwidth is 160 MHz.

In some embodiments of the ninth aspect, the determining a bandwidth for communication between the first device and the second device based on the first group of bits includes: if the first group of bits indicate a plurality of candidate bandwidths, determining the bandwidth for communication from the plurality of candidate bandwidths based on a bandwidth negotiation process between the first device and the second device.

In some embodiments of the ninth aspect, the bandwidth negotiation process is determined depending on whether the PPDU indicates a preset parameter (for example, DYN_BANDWIDTH_IN_NON_HT) or based on a value of a preset parameter indicated by the PPDU. For example, when the parameter DYN_BANDWIDTH_IN_NON_HT is not indicated in the PPDU, it may be determined that the bandwidth negotiation process is a bandwidth negotiation-free process; when the parameter DYN_BANDWIDTH_IN_ NON_HT is indicated as 0 in the PPDU, it may be determined that the bandwidth negotiation process is a static bandwidth negotiation process; or when the parameter DYN_BANDWIDTH_IN_NON_HT is indicated as 1 in the PPDU, it may be determined that the bandwidth negotiation process is a dynamic bandwidth negotiation process.

In some embodiments of the ninth aspect, the determining the bandwidth for communication from the plurality of candidate bandwidths includes: if the bandwidth negotiation process is the dynamic bandwidth negotiation process, selecting a smallest candidate bandwidth from the plurality of candidate bandwidths.

In some embodiments of the ninth aspect, the determining the bandwidth for communication from the plurality of candidate bandwidths includes: if the bandwidth negotiation process is a non-dynamic bandwidth negotiation process, determining the bandwidth for communication from the plurality of candidate bandwidths through blind detection, where the non-dynamic bandwidth negotiation process includes the static bandwidth negotiation process or the bandwidth negotiation-free process.

In some embodiments of the ninth aspect, the PPDU is a PPDU in a non-high throughput non-HT format or a PPDU in a non-high throughput duplicated non-HT duplicated format.

A tenth aspect of this disclosure provides a computer-readable storage medium. The computer-readable storage medium stores one or more computer instructions, and the one or more computer instructions are used by a processor to perform a method. The method includes: A first device receives a PPDU from a second device, where the PPDU is used to determine a group of bits that are associated with a bandwidth and that are in a service field; and if a check error occurs in the group of bits, determines a bandwidth for communication between the first device and the second device based on a bandwidth negotiation process between the first device and the second device.

In some embodiments of the tenth aspect, the determining a bandwidth for communication between the first device and the second device includes: if the bandwidth negotiation process is a dynamic bandwidth negotiation process, determining a preset bandwidth as the bandwidth for communication.

In some embodiments of the tenth aspect, the preset bandwidth is 20 MHz.

In some embodiments of the tenth aspect, the group of bits are a third group of bits, the PPDU is further used to determine a fourth group of bits in a scrambling sequence, and the third group of bits and the fourth group of bits indicate a bandwidth. The determining a bandwidth for communication between the first device and the second device includes: determining the bandwidth for communication based on the bandwidth negotiation process and the fourth group of bits.

In some embodiments of the tenth aspect, the determining the bandwidth for communication based on the bandwidth negotiation process and the fourth group of bits includes: if the fourth group of bits indicate a plurality of candidate bandwidths, determining the bandwidth for communication from the plurality of candidate bandwidths based on the bandwidth negotiation process.

In some embodiments of the tenth aspect, if the fourth group of bits indicate a single candidate bandwidth, the first device may determine the single candidate bandwidth as the bandwidth for communication.

In some embodiments of the tenth aspect, the determining the bandwidth for communication from the plurality of candidate bandwidths based on the bandwidth negotiation process includes: if the bandwidth negotiation process is a dynamic bandwidth negotiation process, selecting a smallest candidate bandwidth from the plurality of candidate bandwidths.

In some embodiments of the tenth aspect, the determining the bandwidth for communication from the plurality of candidate bandwidths based on the bandwidth negotiation process includes: if the bandwidth negotiation process is a non-dynamic bandwidth negotiation process, determining the bandwidth for communication from the plurality of candidate bandwidths through blind detection, where the non-dynamic bandwidth negotiation process includes a static bandwidth negotiation process or a bandwidth negotiation-free process.

In some embodiments of the tenth aspect, the bandwidth negotiation process is determined depending on whether the PPDU indicates a preset parameter or based on a value of a preset parameter indicated by the PPDU.

In some embodiments of the tenth aspect, the PPDU is a PPDU in a non-high throughput non-HT format or a PPDU in a non-high throughput duplicated non-HT duplicated format.

An eleventh aspect of this disclosure provides a computer program product. When the computer program product is run on a computer, the computer is enabled to perform a method. The method includes: A first device receives a PPDU from a second device, where the PPDU is used to determine a scrambling sequence and a service field, and a first group of bits in the scrambling sequence and a second group of bits in the service field indicate a bandwidth; and if a check error occurs in the second group of bits, determines a bandwidth for communication between the first device and the second device based on the first group of bits.

In some embodiments of the eleventh aspect, the determining a bandwidth for communication between the first device and the second device based on the first group of bits includes: if the first group of bits indicate a single candidate bandwidth, determining the single candidate bandwidth as the bandwidth for communication.

In some embodiments of the eleventh aspect, the determining a bandwidth for communication between the first device and the second device based on the first group of bits includes: if a value of the first group of bits is 1, it indicates that the bandwidth for communication is a first bandwidth; if a value of the first group of bits is 2, it indicates that the bandwidth for communication is a second bandwidth; or if a value of the first group of bits is 3, it indicates that the bandwidth for communication is a third bandwidth.

In some embodiments of the eleventh aspect, the first bandwidth is 40 MHz, the second bandwidth is 80 MHz, and the third bandwidth is 160 MHz.

In some embodiments of the eleventh aspect, the determining a bandwidth for communication between the first device and the second device based on the first group of bits includes: if the first group of bits indicate a plurality of candidate bandwidths, determining the bandwidth for communication from the plurality of candidate bandwidths based on a bandwidth negotiation process between the first device and the second device.

In some embodiments of the eleventh aspect, the bandwidth negotiation process is determined depending on whether the PPDU indicates a preset parameter (for example, DYN_BANDWIDTH_IN_NON_HT) or based on a value of a preset parameter indicated by the PPDU. For example, when the parameter DYN_BANDWIDTH_IN_NON_HT is not indicated in the PPDU, it may be determined that the bandwidth negotiation process is a bandwidth negotiation-free process; when the parameter DYN_BANDWIDTH_IN_NON_HT is indicated as 0 in the PPDU, it may be determined that the bandwidth negotiation process is a static bandwidth negotiation process; or when the parameter DYN_BANDWIDTH_IN_NON_HT is indicated as 1 in the PPDU, it may be determined that the bandwidth negotiation process is a dynamic bandwidth negotiation process.

In some embodiments of the eleventh aspect, the determining the bandwidth for communication from the plurality of candidate bandwidths includes: if the bandwidth negotiation process is the dynamic bandwidth negotiation process, selecting a smallest candidate bandwidth from the plurality of candidate bandwidths.

In some embodiments of the eleventh aspect, the determining the bandwidth for communication from the plurality of candidate bandwidths includes: if the bandwidth negotiation process is a non-dynamic bandwidth negotiation process, determining the bandwidth for communication from the plurality of candidate bandwidths through blind detection, where the non-dynamic bandwidth negotiation process includes the static bandwidth negotiation process or the bandwidth negotiation-free process.

In some embodiments of the eleventh aspect, the PPDU is a PPDU in a non-high throughput non-HT format or a PPDU in a non-high throughput duplicated non-HT duplicated format.

A twelfth aspect of this disclosure provides a computer program product. When the computer program product is run on a computer, the computer is enabled to perform a method. The method includes: A first device receives a PPDU from a second device, where the PPDU is used to determine a group of bits that are associated with a bandwidth and that are in a service field; and if a check error occurs in the group of bits, determines a bandwidth for communication between the first device and the second device based on a bandwidth negotiation process between the first device and the second device.

In some embodiments of the twelfth aspect, the determining a bandwidth for communication between the first device and the second device includes: if the bandwidth negotiation process is a dynamic bandwidth negotiation process, determining a preset bandwidth as the bandwidth for communication.

In some embodiments of the twelfth aspect, the preset bandwidth is 20 MHz.

In some embodiments of the twelfth aspect, the group of bits are a third group of bits, the PPDU is further used to determine a fourth group of bits in a scrambling sequence, and the third group of bits and the fourth group of bits indicate a bandwidth. The determining a bandwidth for communication between the first device and the second device includes: determining the bandwidth for communication based on the bandwidth negotiation process and the fourth group of bits.

In some embodiments of the twelfth aspect, the determining the bandwidth for communication based on the bandwidth negotiation process and the fourth group of bits includes: if the fourth group of bits indicate a plurality of candidate bandwidths, determining the bandwidth for communication from the plurality of candidate bandwidths based on the bandwidth negotiation process.

In some embodiments of the twelfth aspect, if the fourth group of bits indicate a single candidate bandwidth, the first device may determine the single candidate bandwidth as the bandwidth for communication.

In some embodiments of the twelfth aspect, the determining the bandwidth for communication from the plurality of candidate bandwidths based on the bandwidth negotiation process includes: if the bandwidth negotiation process is a dynamic bandwidth negotiation process, selecting a smallest candidate bandwidth from the plurality of candidate bandwidths.

In some embodiments of the twelfth aspect, the determining the bandwidth for communication from the plurality of candidate bandwidths based on the bandwidth negotiation process includes: if the bandwidth negotiation process is a non-dynamic bandwidth negotiation process, determining the bandwidth for communication from the plurality of candidate bandwidths through blind detection, where the non-dynamic bandwidth negotiation process includes a static bandwidth negotiation process or a bandwidth negotiation-free process.

In some embodiments of the twelfth aspect, the bandwidth negotiation process is determined depending on whether the PPDU indicates a preset parameter or based on a value of a preset parameter indicated by the PPDU.

In some embodiments of the twelfth aspect, the PPDU is a PPDU in a non-high throughput non-HT format or a PPDU in a non-high throughput duplicated non-HT duplicated format.

The summary part is provided to describe selection of concepts in a simplified form. The conceptions are further described in the following specific implementations. The summary part is not intended to identify key features or essential features of this disclosure or to limit the scope of this disclosure.

BRIEF DESCRIPTION OF DRAWINGS

The foregoing and other features, advantages, and aspects of embodiments of this disclosure become more obvious with reference to the accompanying drawings and the following detailed descriptions. In the accompanying drawings, same or similar reference numerals represent same or similar elements.

In various accompanying drawings, same or similar reference numerals represent same or similar elements.

DESCRIPTION OF EMBODIMENTS

The following describes embodiments of this disclosure in detail with reference to the accompanying drawings. Although some embodiments of this disclosure are shown in the accompanying drawings, it should be understood that this disclosure may be implemented in various forms, and should not be construed as being limited to the embodiments described herein. On the contrary, these embodiments are provided for a more thorough understanding of this disclosure. It should be understood that the accompanying drawings and embodiments of this disclosure are merely used as examples, but are not intended to limit the protection scope of this disclosure.

In descriptions of embodiments of this disclosure, the term "include" and similar terms thereof should be understood as non-exclusive inclusion, that is, "include but are not limited to". The term "based on" should be understood as "at least partially based on". The terms "one embodiment" or "this embodiment" should be understood as "at least one embodiment". The terms "first", "second", and the like may indicate different objects or a same object. Other explicit and implicit definitions may also be included below.

Example Communication Environment

Figure 1:
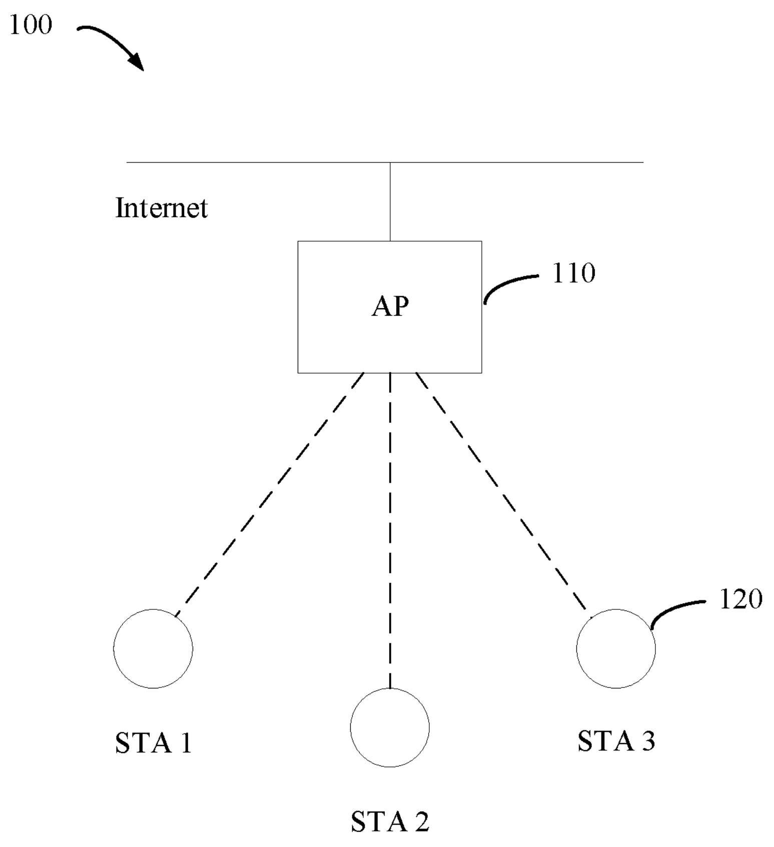
FIG. 1 is a schematic block diagram of a communication environment in which embodiments of this disclosure can be implemented.

IEEE 802.11 is one of mainstream wireless access standards, and has been widely used in commercial applications in the past decade. FIG. 1 is a schematic diagram of a communication environment 100 in which embodiments of this disclosure can be implemented. As shown in FIG. 1, in the communication environment 100, an access point AP 110 accesses the internet in a wired or wireless manner. The access point AP 110 may be associated with one or more stations STAs 120. The access point AP 110 and the associated station STA 120 perform uplink communication and downlink communication by using a preset protocol (for example, the IEEE 802.11 protocol).

In some embodiments, the access point AP 110 may be, for example, a wireless router. The station STA 120 may include a wireless mobile device, and an example of the wireless mobile device includes but is not limited to a smartphone, a notebook computer, a tablet computer, an intelligent wearable device, an in-vehicle mobile device, or the like.

In the IEEE 802.11a standard, only 20 MHz is supported. In a subsequent standard evolution process, a bandwidth keeps increasing. In the IEEE 802.11n standard, a maximum of 40 MHz is supported. In the IEEE 802.11ac/ax standard, a maximum of 160 (80+80) MHz is supported. In a standard later than IEEE 802.11a, to ensure backward compatibility, some MAC frames are sent in a non-high throughput duplicated non-HT duplicated manner on a channel whose bandwidth is greater than 20 MHz. In other words, a frame in an IEEE 802.11a format is sent on each 20 MHz channel, and content on a plurality of 20 MHz channels is repeated. In this way, an IEEE 802.11a station can also smoothly parse the frame. Because a frame format of IEEE 802.11a is 20 MHz, a PPDU in a non-high throughput non-HT or non-HT duplicated format cannot carry bandwidth information. Therefore, a receive end cannot accurately learn a bandwidth currently used by a transmit end.

Because a hidden node usually exists in a wireless local area network, a channel is usually reserved in a manner of interaction using RTS (request to send)/CTS (clear to send). An RTS frame and a CTS frame are sent in a non-HT duplicated manner on a bandwidth greater than 20 MHz. Because a transmit station and a receive station are located in different wireless channel environments, it is very useful for data communication if a bandwidth available to the two parties can be obtained through negotiation based on current channel availability statuses of the two parties before data communication. However, when neither of the RTS frame and the CTS frame can carry bandwidth information, bandwidth negotiation cannot be performed when a channel is reserved.

To resolve this problem, in the IEEE 802.11ac standard, two bits B5 and B6 in the first seven bits of a scrambling sequence (scrambling sequence) are set to a CH_BANDWIDTH_IN_NON_HT field to indicate the bandwidth information. However, four statuses of the CH_BANDWIDTH_IN_NON_HT field are all used up, and consequently, B5 and B6 cannot indicate a bandwidth greater than 160 MHz.

In a bandwidth expansion manner, one or more bits in B7 to B15 in a service SERVICE field in a data part are used together with B5 and B6 in the scrambling sequence to indicate a bandwidth. The first seven bits of the scrambling sequence are a non-zero random sequence. In the IEEE 802.11ac standard, bandwidths indicated by different values of B5B6 are shown in Table 1.

TABLE 1

| Value of B5B6 | Indicated bandwidth |
|---|---|
| 0 | CBW 20 |
| 1 | CBW 40 |
| 2 | CBW 80 |
| 3 | CBW 160 (80 + 80) |

CBW 20, CBW 40, CBW 80, and CBW 160 in the table respectively represent bandwidths of 20 MHz, 40 MHz, 80 MHz, and 160 MHz.

In addition, to enable the receive station to learn whether the transmit station includes CH_BANDWIDTH_IN_NON_HT information in the scrambling sequence, the transmit end uses a signaling TA (transmit address) for indication. The signaling TA means that a unicast/multicast bit in the transmit address TA is set to 1 to indicate that the scrambling sequence of the PPDU carries the CH_BANDWIDTH_IN_NON_HT information. If the unicast/multicast bit in the TA is set to 0, it indicates that the scrambling sequence for sending the PPDU does not carry the CH_BANDWIDTH_IN_NON_HT information. The unicast/multicast bit (b0) is also referred to as an individual/group bit in the standard.

In the IEEE 802.11be standard, to support a 320 MHz bandwidth, one or more bits (for example, B7) in the service SERVICE field are used together with B5 and B6 in the scrambling sequence to indicate a bandwidth. Table 2 shows an example of a specific indication manner.

TABLE 2

| Value of B5B6 | Value of B7 | Indicated bandwidth |
|---|---|---|
| 0 | 0 | CBW 20 |
| 1 | 0 | CBW 40 |
| 2 | 0 | CBW 80 |
| 3 | 0 | CBW 160 (80 + 80) |
| 0 | 1 | CBW 320 |

CBW 20, CBW 40, CBW 80, CBW 160, and CBW 320 in the table respectively represent bandwidths of 20 MHz, 40 MHz, 80 MHz, 160 MHz, and 320 MHz.

However, a conventional receive end does not have a check mechanism for one or more bits (for example, B7) in the service field. As a result, the receive end cannot determine whether a transmission error occurs in the one or more bits. After the check mechanism is added, based on a common design, once a check error occurs, the receive end considers that information is incorrectly received, and does not perform corresponding or subsequent processing. This results in retransmission or channel contention of the transmit end.

It should be noted herein that, the bits B5B6 in the current scrambling sequence correspond to a CH_BANDWIDTH_IN_NON_HT parameter. After B7 in the service field is used together with B5 and B6 in the scrambling sequence to indicate the bandwidth, there are two description manners.

In one manner, the three bits including B5 and B6 in the scrambling sequence and B7 in the service field together correspond to the CH_BANDWIDTH_IN_NON_HT parameter. In this description manner, B5B6 corresponds to two bits in CH_BANDWIDTH_IN_NON_HT, and B7 corresponds to the other bit in CH_BANDWIDTH_IN_NON_HT.

In the other manner, B5 and B6 in the scrambling sequence correspond to the CH_BANDWIDTH_IN_NON_HT parameter. When values of B7 are different, a same CH_BANDWIDTH_IN_NON_HT value corresponds to different bandwidths.

The implementation solutions of this patent are not limited to either of the description manners.

First Implementation of This Disclosure

An example embodiment of this disclosure provides an improved solution, for a first device to determine a bandwidth. Specifically, in some embodiments, the first device receives a PPDU from a second device, where the PPDU is used to determine a scrambling sequence and a service field, and a first group of bits in the scrambling sequence and a second group of bits in the service field indicate a bandwidth. Then, if a check error occurs in the second group of bits, the first device determines a bandwidth for communication between the first device and the second device based on the first group of bits. In this way, according to embodiments of this disclosure, when the check error occurs in the second group of bits, determining of the bandwidth for communication is not abandoned. This avoids unnecessary retransmission or channel contention.

Figure 2:
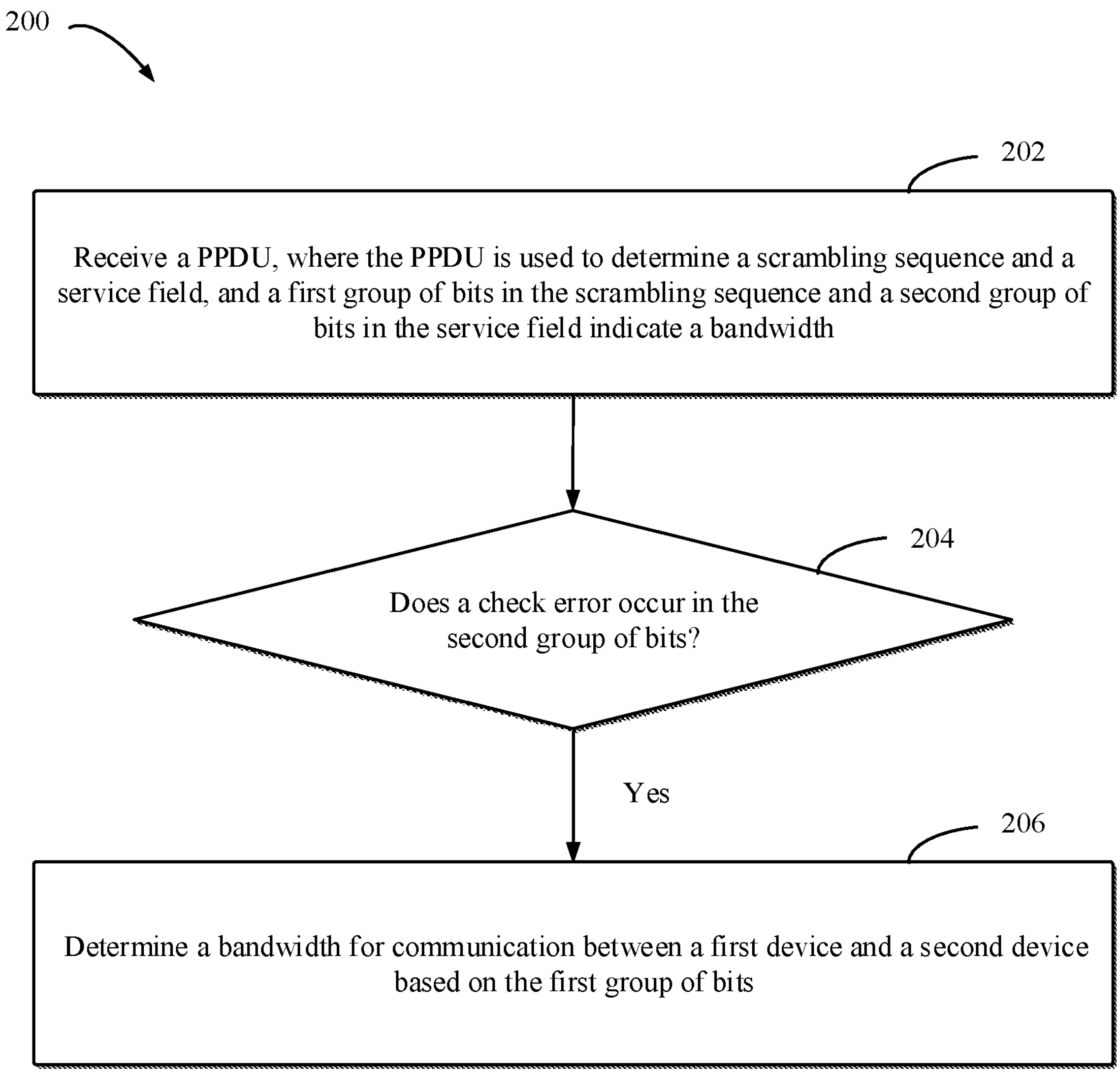
FIG. 2 is a flowchart of a bandwidth determining process according to some embodiments of this disclosure.

Example embodiments of this disclosure are described in detail below with reference to the accompanying drawings. FIG. 2 is a flowchart of a bandwidth determining process 200 according to some embodiments of this disclosure.

As shown in FIG. 2, in block 202, a first device receives a PPDU from a second device, where the PPDU is used to determine a scrambling sequence and a service field, and a first group of bits in the scrambling sequence and a second group of bits in the service field indicate a bandwidth.

In some embodiments, the first device may include, for example, the station STA 120 shown in FIG. 1. Correspondingly, the second device may include the access point AP 110 shown in FIG. 1. According to the solution of this disclosure, the STA 120 may determine a bandwidth for communication between the STA 120 and the access point AP 110 based on a PPDU sent from the access point AP 110.

In another implementation, the first device may alternatively include, for example, the access point AP 110 shown in FIG. 1. Correspondingly, the second device may include the station STA 120 shown in FIG. 1. According to the solution of this disclosure, the access point AP 110 may determine a bandwidth for communication between the access point AP 110 and the station STA 120 based on a PPDU received from the station STA 120.

In still another implementation, the first device may alternatively include, for example, a station STA 1 shown in FIG. 1. Correspondingly, the second device may include a station STA 2 shown in FIG. 1. According to the solution of this disclosure, the STA 1 may determine a bandwidth for communication between the STA 1 and the station 2 based on a PPDU received from the station 2.

In some embodiments, the PPDU received by the first device may carry a control frame or a management frame. In some embodiments of the first aspect, the received PPDU is a PPDU in a non-high throughput non-HT format or a PPDU in a non-high throughput duplicated non-HT duplicated format. An example of the carried control frame includes but is not limited to an RTS (request to send) frame, a CTS (clear to send) frame, a PS-Poll (power-saving poll) frame, a CF-End (contention-free end) frame, a BAR (block acknowledgment request) frame, or an NDP announcement (null data PPDU announcement) frame.

Figure 3A:
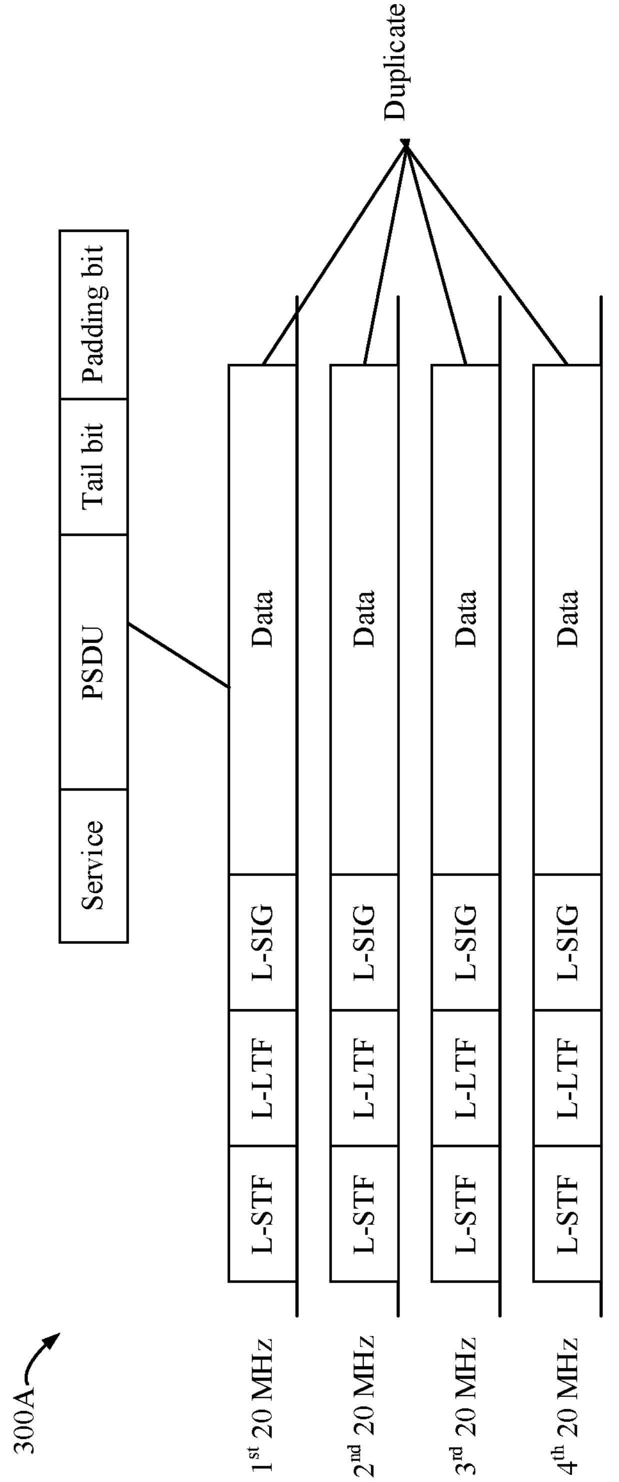
FIG. 3A and FIG. 3B are schematic diagrams of example non-HT duplicated PPDUs according to some embodiments of this disclosure.
Figure 3B:
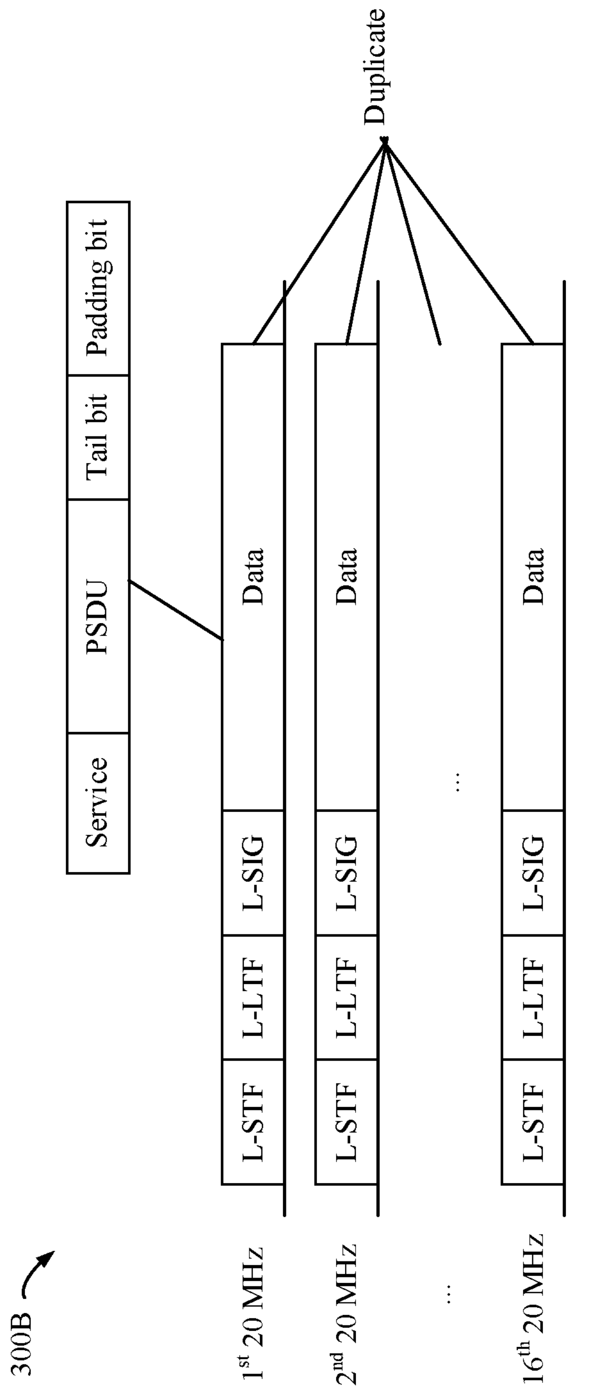

FIG. 3A and FIG. 3B are schematic diagrams 300A and 300B of example non-HT duplicated PPDUs according to some embodiments of this disclosure. FIG. 3A is an entity diagram 300A of sending a non-HT duplicated PPDU on an 80 MHz channel. The non-HT duplicated PPDU is sent on each 20 MHz channel by using an IEEE 802.11a frame format, and specifically includes four parts: an L-STF, an L-LTF, an L-SIG, and data (Data). The data further includes four parts: a service (SERVICE) field, a PSDU (Scrambled PSDU), a tail bit (Tail bit), and a padding bit (Padding bit). The non-HT duplicated PPDU is sent on four 20 MHz channels of 80 MHz in a complete repetition manner.

FIG. 3B is a schematic diagram 300B of sending a non-HT duplicated PPDU on a channel, for example, 320 MHz, greater than 160 MHz. A principle of sending the non-HT duplicated PPDU is similar to that of sending the non-HT duplicated PPDU on 80 MHz shown in FIG. 3A, except that a quantity of repeated copies increases as a bandwidth increases.

The non-HT duplicated PPDU includes a physical layer preamble (PHY Preamble), a signal (SIGNAL) field, and a data (DATA) part. The signal part carries a signal indication and a parity bit that are required for the data part. If a result of performing a check by using the parity bit is correct, the data part continues to be parsed by using indication information in the signal field. On the contrary, if a result of performing a check by using the parity bit is incorrect, it indicates that physical layer signaling is incorrectly received, and the subsequent data part is no longer parsed. The data part includes a SERVICE field, a PSDU field, a tail field, and a padding bit (padding bit).

The PSDU field carries content of a MAC layer frame. The content of the MAC layer frame includes an FCS field used to check whether PSDU content is correct. If the FCS field is correct, it indicates that the frame is correctly received. In this case, a receive station continues to make a response based on the content of the MAC frame according to a protocol procedure. If the FCS field is incorrect, it indicates that the frame is incorrectly received. In this case, a receive station discards the frame. The parity bit error is explained herein. The parity bit (parity bit) in the signal field is used to check the first 17 bits (a RATE field, a Reserved bit, and a LENGTH field). An even parity check is used. To be specific, when a transmit end sends the signal field, it is ensured that a quantity of bits that are set to 1 in the parity bit and the first 17 bits is an even number. If a receive end finds that a quantity of bits that are set to 1 in the received parity bit and the received first 17 bits is an odd number, it indicates that a check error occurs. If the quantity is an even number, it indicates that no check error occurs. In an FCS (frame check sequence) check, the receive station generates a check sequence based on to-be-checked content in a received PSDU and an FCS algorithm, to determine whether the check sequence is the same as a received FCS check sequence. If the check sequence is the same as the received FCS check sequence, no FCS check error occurs. Otherwise, an FCS check error occurs.

In some embodiments, when the second device is to send a non-HT duplicated or non-HT PPDU, the second device may scramble a data part by using a scrambling sequence, to include a scrambled data part in the to-be-sent PPDU. Correspondingly, when receiving the PPDU, the first device may determine, based on the scrambled data part, a scrambling sequence used by the transmit end, and descramble the scrambled data part by using the scrambling sequence, to obtain the data part.

In the data part, a service field includes 16 bits that are respectively indicated as bits 0 to 15 (represented as B0 to B15). The bit 0 is transmitted first in terms of time. The bits 0 to 6 in the service field are set to 0, for the receive end to synchronize descrambling. The remaining nine bits (bits B7 to B15) in the service field are reserved fields and are set to 0. B7 to B15 in the service field may be ignored for a station of a standard earlier than IEEE 802.11be. The service field is carried in all PPDUs sent in a non-HT or non-HT duplicated format. Therefore, the service field is not limited by a specific MAC frame structure and is universal. The service field is originally designed to assist a scrambling operation of a physical layer. This is a common operation for all MAC frames. Therefore, the service field exists in all the MAC frames. In some embodiments, the second device may use the first group of bits (for example, the bits B5 and B6) in the scrambling sequence and the second group of bits (for example, the bit B7) in the service field to indicate a bandwidth, so that more bandwidths can be indicated.

In some embodiments, the first group of bits and/or the second group of bits may include one or more bits. For example, as shown in Table 3, the first group of bits may include the bits B5 and B6 in the scrambling sequence, and the second group of bits may include the bit B7 in the service field.

TABLE 3

| B5B6 in the scrambling sequence | B7 in the SERVICE field | Indicated bandwidth |
|---|---|---|
| 0 | 0 | 20 MHZ |
| 1 | 0 | 40 MHZ |
| 2 | 0 | 80 MHz |
| 3 | 0 | 160 MHz |
| 0 | 1 | 320 MHz |
| 1 to 3 | 1 | Reserved |

It should be understood that the bandwidth indicated in Table 3 is merely an example. For example, 480 MHz may be further indicated by using B5B6 that is 1 and B7 that is 1. This disclosure is not intended to limit how to use the first group of bits and the second group of bits to indicate the bandwidth.

Figures 4, 5:
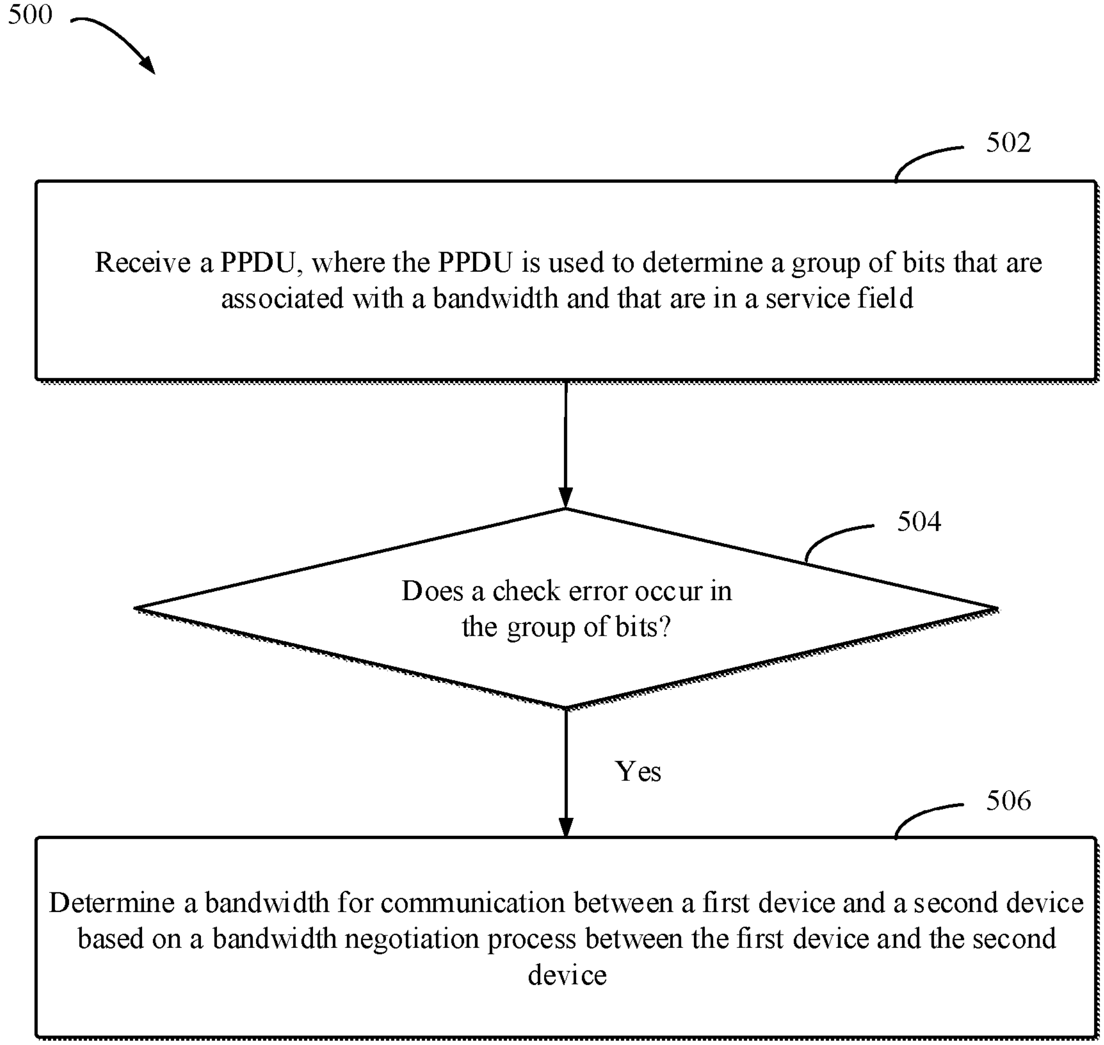
FIG. 4 is a schematic diagram of checking a second group of bits according to an embodiment of this disclosure.
FIG. 5 is a flowchart of a bandwidth determining process according to some other embodiments of this disclosure.

In block 302, if no FCS check error occurs in the PPDU, the first device checks the second group of bits, to determine whether a check error occurs in the second group of bits. In some embodiments, for example, the first device may check the second group of bits by using one or more other bits in the service field. For example, as shown in FIGS. 4, B7 to B9 may be checked based on B10 in the service field by using a parity check method.

It should be understood that the second group of bits may alternatively be checked by using any other suitable bit and/or any other suitable check manner. This disclosure is not intended to limit a specific manner for checking the second group of bits.

In block 304, if a check error occurs in the second group of bits, the first device determines a bandwidth for communication between the first device and the second device based on the first group of bits.

In some embodiments, if the first group of bits indicate a single candidate bandwidth, the single candidate bandwidth is determined as the bandwidth for communication. In the example in Table 3, when a value of B5B6 is 1, 2, or 3, it can indicate a single candidate bandwidth, regardless of a value of B7. On the contrary, when a value of B5B6 is 0, it indicates two candidate bandwidths, that is, 20 MHz and 320 MHz. Therefore, when it is determined that the value of B5B6 is 1, 2, or 3, the first device can uniquely determine the bandwidth for communication, regardless of whether a check error occurs in B7.

For example, the first device may determine the bandwidth based on a pre-established mapping relationship between the first group of bits and a corresponding bandwidth. Still refer to the example in Table 3. When the check error occurs in B7, for example, the first device may determine the bandwidth based on the first group of bits (B5B6 in the scrambling sequence) according to Table 4.

TABLE 4

| B5B6 in the scrambling sequence | Indicated bandwidth |
|---|---|
| 1 | 40 MHZ |
| 2 | 80 MHZ |
| 3 | 160 MHZ |

In some embodiments, if the first group of bits indicate a plurality of candidate bandwidths, the first device may further determine the bandwidth for communication from the plurality of candidate bandwidths based on a bandwidth negotiation process between the first device and the second device.

The bandwidth negotiation process indicates whether bandwidth negotiation is accepted between the first device and the second device. In some embodiments, the bandwidth negotiation process may include a dynamic bandwidth negotiation process. The dynamic bandwidth negotiation process is as follows: When sending an RTS frame, a station that supports dynamic bandwidth negotiation sets B4 (indicating DYN_BANDWIDTH_IN_NON_HT) in the first seven bits of the scrambling sequence to 1 (indicating a dynamic mode); and after a receive station receives the RTS frame, if a NAV (network allocation vector) indicates idle, and a candidate bandwidth less than or equal to a bandwidth of the RTS frame meets the following condition, the receive station sends a CTS (clear to send) frame by using the candidate bandwidth. Otherwise, no CTS is returned. The condition that needs to be met is that a detection result of CCA (clear channel assessment) for a secondary channel of the candidate bandwidth is idle within a PIFS (point coordination function interframe space) time before the RTS is sent.

In some embodiments, the bandwidth negotiation process may include a static bandwidth negotiation process. The static bandwidth negotiation process is as follows: When sending an RTS frame, a station that does not support dynamic bandwidth negotiation sets B4 (indicating DYN_BANDWIDTH_IN_NON_HT) in the first seven bits of the scrambling sequence to 0 (indicating a static mode); and after a receive station receives the RTS frame, if a NAV indicates idle, and a bandwidth of the RTS frame meets the following condition, the receive station sends a CTS frame by using a same bandwidth as that of the RTS frame. Otherwise, no CTS is returned. The condition that needs to be met is that a detection result of CCA for a secondary channel of the RTS bandwidth is idle within a PIFS time before the RTS is sent.

In some embodiments, the bandwidth negotiation process may further include a bandwidth negotiation-free process. The bandwidth negotiation-free process is as follows: When a station sends a non-HT or non-HT PPDU that carries content that is not an RTS frame, a DYN_BANDWIDTH_IN_NON_HT indication is not used, in other words, B4 in the first seven bits of the scrambling sequence may be randomly generated on the premise that the first seven bits of the scrambling sequence are not all 0s. In this case, a receive station is to return a response frame by using a same bandwidth as that of the received frame.

In this specification, considering that both the static bandwidth negotiation process and the bandwidth negotiation-free process require the receive station to accurately identify the bandwidth of the received frame, to set the bandwidth of the response frame to be the same as the bandwidth of the received frame, the static bandwidth negotiation process and the bandwidth negotiation-free process are collectively referred to as a "non-dynamic bandwidth negotiation process".

In some embodiments of the first aspect, the bandwidth negotiation process is determined depending on whether the PPDU indicates a preset parameter (for example, DYN_BANDWIDTH_IN_NON_HT) or based on a value of a preset parameter indicated by the PPDU. For example, when the parameter DYN_BANDWIDTH_IN_NON_HT is not indicated in the PPDU, it may be determined that the bandwidth negotiation process is the bandwidth negotiation-free process; when the parameter DYN_BANDWIDTH_IN_ NON_HT is indicated as 0 in the PPDU, it may be determined that the bandwidth negotiation process is the static bandwidth negotiation process; or when the parameter DYN_BANDWIDTH_IN_NON_HT is indicated as 1 in the PPDU, it may be determined that the bandwidth negotiation process is the dynamic bandwidth negotiation process.

In some embodiments, if the bandwidth negotiation process is the dynamic bandwidth negotiation process, the first device may select a smallest candidate bandwidth from the plurality of candidate bandwidths. Still refer to the example in Table 3. If the first device determines that the value of B5B6 is 0, and the bandwidth negotiation process between the first device and the second device is the dynamic negotiation process, the first device may select a smaller bandwidth (for example, 20 MHz) from the two candidate bandwidths (for example, the 20 MHz bandwidth and the 320 MHz bandwidth) indicated by B5B6 as the bandwidth for communication between the first device and the second device.

In another example, if the value of B5B6 is 1 and the value of B7 is 0, it indicates 40 MHz; or if the value of B5B6 is 1 and the value of B7 is 1, it indicates 480 MHz. In this case, if the check error occurs in B7, and the value of B5B6 is 1, the first device may use a smaller 40 MHz bandwidth in the two bandwidths as the bandwidth for communication between the first device and the second device.

Based on this manner, although a part of bandwidth may be lost, the first device can successfully establish data communication between the first device and the second device, instead of simply considering that a check error occurs in the PPDU and making no response. This can avoid retransmission or channel contention of the transmit end, save valuable air interface resources, and improve system efficiency.

In some embodiments, alternatively, the first device may directly determine, based on the pre-established mapping relationship between the first group of bits and a corresponding bandwidth, the bandwidth corresponding to the first group of bits. For example, a mapping table (for example, Table 5) corresponding to the dynamic bandwidth negotiation process may be pre-established, so that the first device may directly determine, based on the mapping table, bandwidths corresponding to different values of the first group of bits in the dynamic bandwidth negotiation process.

TABLE 5

| B5B6 in the scrambling sequence | Indicated bandwidth |
|---|---|
| 0 | 20 MHz |
| 1 | 40 MHZ |
| 2 | 80 MHz |
| 3 | 160 MHz |

In some embodiments, if the bandwidth negotiation process is the non-dynamic bandwidth negotiation process, the first device may determine the bandwidth for communication from the plurality of candidate bandwidths through blind detection.

In some embodiments, blind detection may be performed based on information obtained by the physical layer in a receiving process. For example, in a process of receiving the PPDU, an EHT receive station records received signal strength on each 20 MHz sub-channel within 320 MHz, performs cross-correlation on receive channels on each 20 MHz sub-channel, or separately performs frame header synchronization on each 20 MHz sub-channel. In this way, it is determined whether there is a received signal only in primary 20 MHz or there is a received signal in each 20 MHz within 320 MHz. It should be understood that any suitable blind detection technology may be used, and this disclosure is not intended to limit a specific manner of blind detection.

It should be understood that a difference from a conventional method for directly determining a bandwidth based on blind detection lies in that, for example, selection is performed from 20 MHz and 320 MHz through blind detection, because the first device needs to identify only the two types of bandwidths: 20 MHz and 320 MHz, and a difference between values of the two types of bandwidths is huge, accuracy of blind detection is greatly improved.

Similar to the dynamic bandwidth negotiation process, in some embodiments, alternatively, the first device may directly determine, based on the pre-established mapping relationship between the first group of bits and a corresponding bandwidth, the bandwidth corresponding to the first group of bits. For example, a mapping table (for example, Table 6) corresponding to the non-dynamic bandwidth negotiation process may be pre-established, so that the first device may directly determine, based on the mapping table, bandwidths corresponding to different values of the first group of bits in the non-dynamic bandwidth negotiation process.

TABLE 6

| B5B6 in the scrambling sequence | Indicated bandwidth |
|---|---|
| 0 | 20 MHz or 320 MHz as identified through blind detection |
| 1 | 40 MHZ |
| 2 | 80 MHz |
| 3 | 160 MHZ |

In some embodiments, to reduce a bandwidth waste caused in the dynamic bandwidth negotiation process in which the smaller bandwidth is directly used as the bandwidth for communication between the first device and the second device, a correspondence between the first group of bits, the second group of bits, and a bandwidth may be further adjusted at the transmit end and the receive end.

An example in which B5B6 in the scrambling sequence and B7 in the service field indicate a bandwidth mode is still used, and a mapping relationship between B5B6, B7, and a bandwidth may be represented, for example, as that in Table 7. A difference from the mapping relationship in Table 3 lies in that, 320 MHz may be indicated by using a value of B5B6 that is 3 and a value of B7 that is 1.

TABLE 7

| B5B6 in the scrambling sequence | B7 in the SERVICE field | Indicated bandwidth |
|---|---|---|
| 0 | 0 | 20 MHZ |
| 1 | 0 | 40 MHz |
| 2 | 0 | 80 MHz |
| 3 | 0 | 160 MHz |
| 0 to 2 | 1 | Reserved |
| 3 | 1 | 320 MHz |

Correspondingly, the mapping relationship in the dynamic bandwidth negotiation process described above may be represented as that in Table 8, and the mapping relationship in the non-dynamic bandwidth negotiation process may be represented as that in Table 9.

TABLE 8

| B5B6 in the scrambling sequence | Indicated bandwidth |
|---|---|
| 0 | 20 MHZ |
| 1 | 40 MHZ |
| 2 | 80 MHz |
| 3 | 160 MHz |

TABLE 9

| B5B6 in the scrambling sequence | Indicated bandwidth |
|---|---|
| 0 | 20 MHz |
| 1 | 40 MHZ |
| 2 | 80 MHZ |
| 3 | The bandwidth is identified as 160 MHz or 320 MHz through blind detection |

It can be learned that in the dynamic bandwidth negotiation process, if the check error occurs in B7 and the value of B5B6 is 3, the first device may determine that the bandwidth is 160 MHz, that is, make a response by using 160 MHz instead of 20 MHz. In this way, a bandwidth loss can be reduced.

Second Implementation of This Disclosure

An example embodiment of this disclosure provides an improved solution, for a first device to determine a bandwidth for communication between the first device and a second device. Specifically, in some embodiments, the first device receives a PPDU from the second device, where the PPDU is used to determine a group of bits that are associated with a bandwidth and that are in a service field. Then, if a check error occurs in the group of bits, the first device determines the bandwidth for communication between the first device and the second device based on a bandwidth negotiation process between the first device and the second device. In this way, according to embodiments of this disclosure, when the check error occurs in the group of bits, determining of the bandwidth for communication is not abandoned. This avoids unnecessary retransmission or channel contention.

Example embodiments of this disclosure are described in detail below with reference to the accompanying drawings. FIG. 5 is a flowchart of a bandwidth determining process 500 according to some embodiments of this disclosure.

As shown in FIG. 5, in block 502, a first device receives a PPDU from a second device, where the PPDU is used to determine a group of bits that are associated with a bandwidth and that are in a service field.

In some embodiments, the first device may include, for example, the station STA 120 shown in FIG. 1. Correspondingly, the second device may include the access point AP 110 shown in FIG. 1. According to the solution of this disclosure, the STA 120 may determine a bandwidth for communication between the STA 120 and the access point AP 110 based on a PPDU sent from the access point AP 110.

In another implementation, the first device may alternatively include, for example, the access point AP 110 shown in FIG. 1. Correspondingly, the second device may include the station STA 120 shown in FIG. 1. According to the solution of this disclosure, the access point AP 110 may determine a bandwidth for communication between the access point AP 110 and the station STA 120 based on a PPDU received from the station STA 120.

In still another implementation, the first device may alternatively include, for example, a station STA 1 shown in FIG. 1. Correspondingly, the second device may include a station STA 2 shown in FIG. 1. According to the solution of this disclosure, the STA 1 may determine a bandwidth for communication between the STA 1 and the station 2 based on a PPDU received from the station 2.

In some embodiments, the PPDU received by the first device may carry a control frame or a management frame. In some embodiments of the first aspect, the received PPDU is a PPDU in a non-high throughput non-HT format or a PPDU in a non-high throughput duplicated non-HT duplicated format. An example of the carried control frame includes but is not limited to an RTS (request to send) frame, a CTS (clear to send) frame, a PS-Poll (power-saving poll) frame, a CF-End (contention-free end) frame, a BAR (block acknowledgment request) frame, or an NDP announcement (null data PPDU announcement) frame. For specific structures of a non-HT frame and a non-HT duplicated frame, refer to the foregoing descriptions about FIG. 3. Details are not described herein again.

In some embodiments, when the second device is to send a non-HT duplicated or non-HT PPDU, the second device may scramble a data part by using a scrambling sequence, to include a scrambled data part in the to-be-sent PPDU. Correspondingly, when receiving the PPDU, the first device may determine, based on the scrambled data part, a scrambling sequence used by the transmit end, and descramble the scrambled data part by using the scrambling sequence, to obtain the data part.

In the data part, a service field includes 16 bits that are respectively indicated as bits 0 to 15. The bit 0 is transmitted first in terms of time. The bits 0 to 6 in the service field are set to 0, for the receive end to synchronize descrambling. The remaining nine bits (bits B7 to B15) in the service field are reserved fields and are set to 0. B7 to B15 in the service field may be ignored for a station of a standard earlier than IEEE 802.11be. The service field is carried in all PPDUs sent in a non-HT or non-HT duplicated format. Therefore, the service field is not limited by a specific MAC frame structure and is universal. The service field is originally designed to assist a scrambling operation of a physical layer. This is a common operation for all MAC frames. Therefore, the service field exists in all the MAC frames. In some embodiments, the second device may use a group of bits (for example, bits B5 and B6) in the scrambling sequence and the group of bits (for example, the bit B7) in the service field to indicate a bandwidth, so that more bandwidths can be indicated.

TABLE 10

| B5B6 in the scrambling sequence | B7 in the SERVICE field | Indicated bandwidth |
|---|---|---|
| 0 | 0 | 20 MHz |
| 1 | 0 | 40 MHz |
| 2 | 0 | 80 MHZ |
| 3 | 0 | 160 MHz |
| 0 | 1 | 320 MHz |
| 1 to 3 | 1 | Reserved |

In some embodiments, the group of bits in the service field may include one or more bits. For example, as shown in Table 10, the group of bits in the scrambling sequence may include the bits B5 and B6 in the scrambling sequence, and the group of bits in the service field may include the bit B7 in the service field.

It should be understood that the bandwidth indicated in Table 10 is merely an example. For example, 480 MHz may be further indicated by using B5B6 that is 1 and B7 that is 1. This disclosure is not intended to limit how to use a bit to indicate the bandwidth.

In block 504, if no FCS check error occurs in the PPDU, the first device checks the group of bits, to determine whether a check error occurs in the group of bits. In some embodiments, for example, the first device may check the group of bits by using one or more other bits in the service field. Similarly, as described with reference to FIG. 4, the first device may check B7 to B9 based on B10 in the service field by using a parity check method.

It should be understood that the group of bits may alternatively be checked by using any other suitable bit and/or any other suitable check manner. This disclosure is not intended to limit a specific manner for checking the group of bits.

In block 506, if a check error occurs in the group of bits, the first device determines a bandwidth for communication between the first device and the second device based on a bandwidth negotiation process between the first device and the second device.

The bandwidth negotiation process indicates whether bandwidth negotiation is accepted between the first device and the second device. In some embodiments, the bandwidth negotiation process may include a dynamic bandwidth negotiation process. The dynamic bandwidth negotiation process is as follows: When sending an RTS frame, a station that supports dynamic bandwidth negotiation sets B4 (indicating DYN_BANDWIDTH_IN_NON_HT) in the first seven bits of the scrambling sequence to 1 (indicating a dynamic mode); and after a receive station receives the RTS frame, if a NAV (network allocation vector) indicates idle, and a candidate bandwidth less than or equal to a bandwidth of the RTS frame meets the following condition, the receive station sends a CTS (clear to send) frame by using the candidate bandwidth. Otherwise, no CTS is returned. The condition that needs to be met is that a detection result of CCA (clear channel assessment) for a secondary channel of the candidate bandwidth is idle within a PIFS (point coordination function interframe space) time before the RTS is sent.

In some embodiments, the bandwidth negotiation process may include a static bandwidth negotiation process. The static bandwidth negotiation process is as follows: When sending an RTS frame, a station that does not support dynamic bandwidth negotiation sets B4 (indicating DYN_BANDWIDTH_IN_NON_HT) in the first seven bits of the scrambling sequence to 0 (indicating a static mode); and after a receive station receives the RTS frame, if a NAV indicates idle, and a bandwidth of the RTS frame meets the following condition, the receive station sends a CTS frame by using a same bandwidth as that of the RTS frame. Otherwise, no CTS is returned. The condition that needs to be met is that a detection result of CCA for a secondary channel of the RTS bandwidth is idle within a PIFS time before the RTS is sent.

In some embodiments, the bandwidth negotiation process may further include a bandwidth negotiation-free process. The bandwidth negotiation-free process is as follows: When a station sends a non-HT or non-HT PPDU that carries content that is not an RTS frame, a DYN_BANDWIDTH_IN_NON_HT indication is not used, in other words, B4 in the first seven bits of the scrambling sequence may be randomly generated on the premise that the first seven bits of the scrambling sequence are not all 0s. In this case, a receive station is to return a response frame by using a same bandwidth as that of the received frame.

In this specification, considering that both the static bandwidth negotiation process and the bandwidth negotiation-free process require the receive station to accurately identify the bandwidth of the received frame, to set the bandwidth of the response frame to be the same as the bandwidth of the received frame, the static bandwidth negotiation process and the bandwidth negotiation-free process are collectively referred to as a "non-dynamic bandwidth negotiation process".

In some embodiments, the bandwidth negotiation process is determined depending on whether the PPDU indicates a preset parameter (for example, DYN_BANDWIDTH_IN_NON_HT) or based on a value of a preset parameter indicated by the PPDU. For example, when the parameter DYN_BANDWIDTH_IN_NON_HT is not indicated in the PPDU, it may be determined that the bandwidth negotiation process is the bandwidth negotiation-free process; when the parameter DYN_BANDWIDTH_IN_NON_HT is indicated as 0 in the PPDU, it may be determined that the bandwidth negotiation process is the static bandwidth negotiation process; or when the parameter DYN_BANDWIDTH_IN_NON_HT is indicated as 1 in the PPDU, it may be determined that the bandwidth negotiation process is the dynamic bandwidth negotiation process.

In some embodiments, if the bandwidth negotiation process is the dynamic bandwidth negotiation process, a preset bandwidth is determined as the bandwidth for communication. For example, the preset bandwidth may be 20 MHz. Based on this manner, if the check error occurs in the group of bits in the service field, the first device may directly determine 20 MHz as the bandwidth for communication between the first device and the second device. In this way, on one hand, a case in which the first device directly does not respond to the PPDU can be avoided, and on the other hand, processing complexity of the first device can be reduced.

In some embodiments, the first device may further determine the bandwidth for communication between the first device and the second device with reference to both the bandwidth negotiation process and the group of bits in the scrambling sequence. For ease of description, in this implementation, the group of bits in the service field are referred to as a third group of bits (for example, B7 in the service field), and the group of bits in the scrambling sequence are referred to as a fourth group of bits (for example, B5B6 in the scrambling sequence).

Correspondingly, if the fourth group of bits indicate a plurality of candidate bandwidths, the first device determines the bandwidth for communication from the plurality of candidate bandwidths based on the bandwidth negotiation process. On the contrary, if the fourth group of bits indicate a single candidate bandwidth, the first device may determine the single candidate bandwidth as the bandwidth for communication.

In some embodiments, if the bandwidth negotiation process is the dynamic bandwidth negotiation process, the first device may select a smallest candidate bandwidth from the plurality of candidate bandwidths. Still refer to the example in Table 10. If the first device determines that a value of B5B6 is 0, and the bandwidth negotiation process between the first device and the second device is the dynamic negotiation process, the first device may select a smaller bandwidth (for example, 20 MHz) from the two candidate bandwidths (for example, 20 MHz and 320 MHz) indicated by B5B6 as the bandwidth for communication between the first device and the second device.

In another example, if a value of B5B6 is 1 and a value of B7 is 0, it indicates 40 MHz; or if a value of B5B6 is 1 and a value of B7 is 1, it indicates 480 MHz. In this case, if a check error occurs in B7, and the value of B5B6 is 1, the first device may use a smaller 40 MHz bandwidth in the two bandwidths as the bandwidth for communication between the first device and the second device.

Based on this manner, although a part of bandwidth may be lost, the first device can successfully establish data communication between the first device and the second device, instead of simply considering that a check error occurs in the PPDU and making no response. This can avoid retransmission or channel contention of the transmit end, save valuable air interface resources, and improve system efficiency.

In some embodiments, alternatively, the first device may directly determine, based on a pre-established mapping relationship between the fourth group of bits and a corresponding bandwidth, the bandwidth corresponding to the fourth group of bits. For example, a mapping table (for example, Table 11) corresponding to the dynamic bandwidth negotiation process may be pre-established, so that the first device may directly determine, based on the mapping table, bandwidths corresponding to different values of the fourth group of bits in the dynamic bandwidth negotiation process.

TABLE 11

| B5B6 in the scrambling sequence | Indicated bandwidth |
|---|---|
| 0 | 20 MHz |
| 1 | 40 MHZ |
| 2 | 80 MHz |
| 3 | 160 MHz |

In some embodiments, if the bandwidth negotiation process is the non-dynamic bandwidth negotiation process, the first device may determine the bandwidth for communication from the plurality of candidate bandwidths through blind detection.

In some embodiments, blind detection may be performed based on information obtained by the physical layer in a receiving process. For example, in a process of receiving the PPDU, an EHT receive station records received signal strength on each 20 MHz sub-channel within 320 MHz, performs cross-correlation on receive channels on each 20 MHz sub-channel, or separately performs frame header synchronization on each 20 MHz sub-channel. In this way, it is determined whether there is a received signal only in primary 20 MHz or there is a received signal in each 20 MHz within 320 MHz. It should be understood that any suitable blind detection technology may be used, and this disclosure is not intended to limit a specific manner of blind detection.

It should be understood that a difference from a conventional method for directly determining a bandwidth based on blind detection lies in that, for example, selection is performed from 20 MHz and 320 MHz through blind detection, because the first device needs to identify only the two types of bandwidths: 20 MHz and 320 MHz, and a difference between values of the two types of bandwidths is huge, accuracy of blind detection is greatly improved.

Similar to the dynamic bandwidth negotiation process, in some embodiments, alternatively, the first device may directly determine, based on the pre-established mapping relationship between the fourth group of bits and a corresponding bandwidth, the bandwidth corresponding to the fourth group of bits. For example, a mapping table (for example, Table 12) corresponding to the non-dynamic bandwidth negotiation process may be pre-established, so that the first device may directly determine, based on the mapping table, bandwidths corresponding to different values of the fourth group of bits in the non-dynamic bandwidth negotiation process.

TABLE 12

| B5B6 in the scrambling sequence | Indicated bandwidth |
|---|---|
| 0 | The bandwidth is identified as 20 MHz or 320 MHz through blind detection |
| 1 | 40 MHz |
| 2 | 80 MHZ |
| 3 | 160 MHZ |

In some embodiments, to reduce a bandwidth waste caused in the dynamic bandwidth negotiation process in which the smaller bandwidth is directly used as the bandwidth for communication between the first device and the second device, a correspondence between the third group of bits, the fourth group of bits, and a bandwidth may be further adjusted at the transmit end and the receive end.

An example in which B5B6 in the scrambling sequence and B7 in the service field indicate a bandwidth mode is still used, and a mapping relationship between B5B6, B7, and a bandwidth may be represented, for example, as that in Table 13. A difference from the mapping relationship in Table 3 lies in that, 320 MHz may be indicated by using a value of B5B6 that is 3 and a value of B7 that is 1.

TABLE 13

| B5B6 in the scrambling sequence | B7 in the SERVICE field | Indicated bandwidth |
|---|---|---|
| 0 | 0 | 20 MHz |
| 1 | 0 | 40 MHz |
| 2 | 0 | 80 MHz |
| 3 | 0 | 160 MHz |
| 0 to 2 | 1 | Reserved |
| 3 | 1 | 320 MHz |

Correspondingly, the mapping relationship in the dynamic bandwidth negotiation process described above may be represented as that in Table 14, and the mapping relationship in the non-dynamic bandwidth negotiation process may be represented as that in Table 15.

TABLE 14

| B5B6 in the scrambling sequence | Indicated bandwidth |
|---|---|
| 0 | 20 MHZ |
| 1 | 40 MHZ |
| 2 | 80 MHZ |
| 3 | 160 MHz |

TABLE 15

| B5B6 in the scrambling sequence | Indicated bandwidth |
|---|---|
| 0 | 20 MHz |
| 1 | 40 MHz |
| 2 | 80 MHz |
| 3 | The bandwidth is identified as 160 MHz or 320 MHz through blind detection |

It can be learned that in the dynamic bandwidth negotiation process, if the check error occurs in B7 and the value of B5B6 is 3, the first device may determine that the bandwidth is 160 MHz, that is, make a response by using 160 MHz instead of 20 MHz. In this way, a bandwidth loss can be reduced.

Example Apparatus and Example Device

Figure 6:
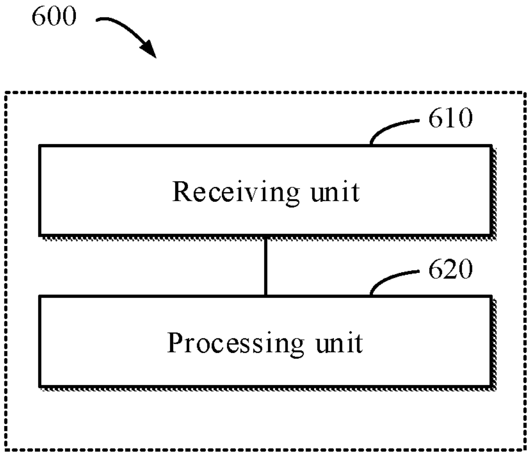
FIG. 6 is a schematic block diagram of a first device according to some embodiments of this disclosure.

FIG. 6 is a schematic block diagram of a first device 600 according to some embodiments of this disclosure. As shown in FIG. 6, the first device 600 includes a receiving unit 610 and a processing unit 620. The receiving unit 610 is configured to receive a PPDU from a second device, where the PPDU is used to determine a scrambling sequence and a service field, and a first group of bits in the scrambling sequence and a second group of bits in the service field indicate a bandwidth. The processing unit 620 is configured to: if a check error occurs in the second group of bits, determine a bandwidth for communication between the apparatus and the second device based on the first group of bits.

It should be understood that the receiving unit 610 and the processing unit 620 in the first device 600 may be further configured to implement another process or step in bandwidth determining that is described in the foregoing first implementation. For specific details, refer to the foregoing related descriptions. Details are not described herein again.

Figure 7:
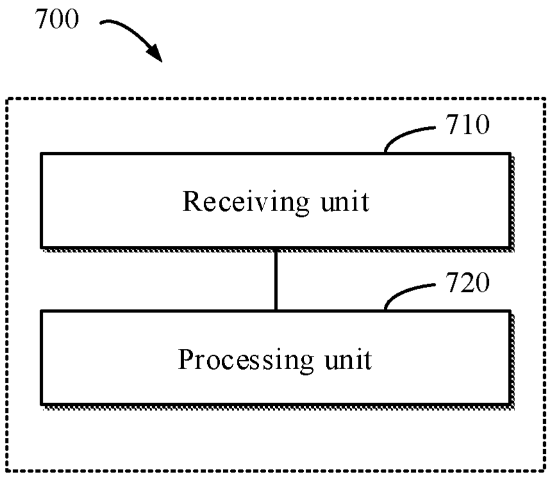
FIG. 7 is a schematic block diagram of a first device according to some other embodiments of this disclosure.

FIG. 7 is a schematic block diagram of a first device 700 according to some other embodiments of this disclosure. As shown in FIG. 7, the first device 700 includes a receiving unit 710 and a processing unit 720. The receiving unit 710 is configured to receive a PPDU from a second device, where the PPDU is used to determine a group of bits that are associated with a bandwidth and that are in a service field. The processing unit 720 is configured to: if a check error occurs in the group of bits, determine a bandwidth for communication between the first device and the second device based on a bandwidth negotiation process between the first device and the second device.

It should be understood that the receiving unit 710 and the processing unit 720 in the first device 700 may be further configured to implement another process or step in bandwidth determining that is described in the foregoing second implementation. For specific details, refer to the foregoing related descriptions. Details are not described herein again.

It should be understood that the first device 600 and/or the first device 700 may be implemented by using an application-specific integrated circuit, one or more FPGAs (field programmable gate arrays), a PLD (programmable logic device), a controller, a state machine, gate logic, a discrete hardware component, any other suitable circuit, or any combination of circuits that can perform various processes of this disclosure, a chip, a board, a communication device, or the like.

Figure 8:
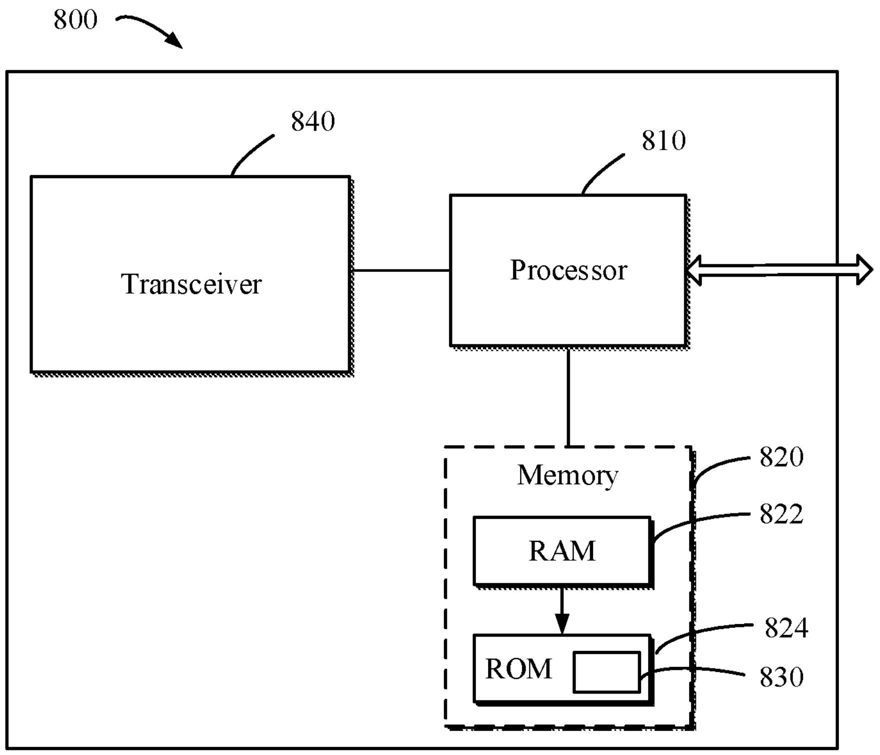
FIG. 8 is a simplified block diagram of an example device suitable for implementing some embodiments of this disclosure.

FIG. 8 is a simplified block diagram of an example device 800 suitable for implementing embodiments of this disclosure. The device 800 may be configured to implement the first device in this disclosure. As shown in the figure, the device 800 includes one or more processors 810 and a transceiver 840 coupled to the processor 810.

The transceiver 840 is configured to implement functions of the receiving units in FIG. 6 and FIG. 7. For specific details, refer to the foregoing descriptions. Details are not described herein again.

The processor 810 is configured to implement functions of the processing units in FIG. 6 and FIG. 7. For specific details, refer to the foregoing descriptions. Details are not described herein again.

Optionally, the first device 800 further includes a memory 820 coupled to the processor 810. The memory 820 is configured to store instructions executed by the processor. When the instructions are executed by the processor, the processor can implement the functions of the processing units in FIG. 6 and FIG. 7. For specific details, refer to the foregoing descriptions. Details are not described herein again.

The transceiver 840 may be configured to perform bidirectional communication. The transceiver 840 may have at least one communication interface used for communication. The communication interface may include any interface necessary for communicating with another device.

The processor 810 may be any type of processor suitable for a local technical network, and may include but is not limited to one or more of a general-purpose computer, a dedicated computer, a microcontroller, a digital signal controller (DSP), and a controller-based multi-core controller architecture. The device 800 may have a plurality of processors, for example, application-specific integrated circuit chips, where the chips belong, in terms of time, to a clock synchronized with a main processor.

The memory 820 may include one or more non-volatile memories and one or more volatile memories. Examples of the non-volatile memory include but are not limited to a read-only memory (ROM) 824, an erasable programmable read-only memory (EPROM), a flash memory, a hard disk, a compact disc (CD), a digital video disk (DVD), and another magnetic storage and/or optical storage. Examples of the volatile memory include but are not limited to a random access memory (RAM) 822 and another volatile memory that does not persist in power outage duration.

A computer program 830 includes computer-executable instructions executed by the associated processor 810. The program 830 may be stored in the ROM 824. The processor 810 may perform any suitable action and processing by loading the program 830 into the RAM 822.

Embodiments of this disclosure may be implemented by using the program 830, so that the device 800 may perform any process described with reference to FIG. 2 to FIG. 6. Embodiments of this disclosure may alternatively be implemented by using hardware or a combination of software and hardware.

In some embodiments, the program 830 may be tangibly included in a computer-readable medium. The computer-readable medium may be included in the device 800 (for example, in the memory 820) or another storage device that can be accessed by the device 800. The program 830 may be loaded from the computer-readable medium to the RAM 822 for execution. The computer-readable medium may include any type of tangible non-volatile memory, such as a ROM, an EPROM, a flash memory, a hard disk, a CD, or a DVD.

Generally, various embodiments of this disclosure may be implemented by using hardware or a dedicated circuit, software, logic, or any combination thereof. Some aspects may be implemented by using hardware, and other aspects may be implemented by using firmware or software, and may be performed by a controller, a microprocessor, or another computing device. Although various aspects of embodiments of this disclosure are shown and illustrated as block diagrams, flowcharts, or other diagrams, it should be understood that the blocks, apparatuses, systems, technologies, or methods described in this specification may be implemented as, for example rather than a limitation, hardware, software, firmware, dedicated circuits, logic, general-purpose hardware, controllers, other computing devices, or a combination thereof.

This disclosure further provides at least one computer program product tangibly stored on a non-transitory computer-readable storage medium. The computer program product includes computer-executable instructions, for example, instructions included in a program module. The instructions are executed in a device on a target real or virtual processor, to perform the process/method described above. Generally, the program module includes a routine, a program, a library, an object, a class, a component, a data structure, and the like that execute a particular task or implement a particular abstract data type. In various embodiments, functions of program modules may be combined or a function of a program module may be split as needed. Machine-executable instructions for the program module may be executed locally or within a distributed device. In the distributed device, the program module may be located in local and remote storage media.

Computer program code used to implement the method disclosed in this disclosure may be written in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In a context of this disclosure, the computer program code or related data may be carried by any suitable carrier, so that a device, an apparatus, or a processor can perform various processing and operations described above. Examples of the carrier include a signal, a computer-readable medium, and the like. Examples of the signal may include propagating signals in electrical, optical, radio, sound, or other forms, such as a carrier and an infrared signal.

The computer-readable medium may be any tangible medium that includes or stores a program used for or related to an instruction execution system, apparatus, or device. The computer-readable medium may be a computer-readable signal medium or a computer-readable storage medium. The computer-readable medium may include but is not limited to an electronic, magnetic, optical, electromagnetic, infrared, or semiconductor system, apparatus, or device, or any suitable combination thereof. More detailed examples of the computer-readable storage medium include an electrical connection with one or more wires, a portable computer disk, a hard disk, a random access memory (RAM), a read-only memory (ROM), an erasable programmable read-only memory (EPROM), a flash memory, an optical storage device, a magnetic storage device, or any suitable combination thereof.

In addition, although the operations of the method disclosed in this disclosure are described in a particular order in the accompanying drawings, this does not require or imply that these operations need to be performed in the particular order or that all of the shown operations need to be performed to achieve a desired result. Instead, an execution order of the steps depicted in the flowchart may be changed. In addition or optionally, some steps may be omitted, a plurality of steps may be combined into one step for execution, and/or one step may be decomposed into a plurality of steps for execution. It should further be noted that features and functions of two or more apparatuses according to this disclosure may be specified in one apparatus. On the contrary, features and functions of one apparatus described above may be further specified in a plurality of apparatuses through classification.

The implementations of this disclosure are described above. The foregoing descriptions are examples, are not exhaustive, and are not limited to the disclosed implementations. Many modifications and variations are clear to a person of ordinary skill in the art without departing from the scope and spirit of the described implementations. Selection of terms used in this specification is intended to well explain implementation principles, actual application, or improvements to technologies in the market, or to enable another person of ordinary skill in the art to understand the implementations disclosed in this specification.

What is claimed is:

1. A bandwidth determining method, comprising:

receiving, by a first device, a physical layer protocol data unit (PPDU) from a second device, wherein the PPDU comprises a scrambling sequence and a service field, and a first group of bits in the scrambling sequence and a second group of bits in the service field indicate at least one candidate bandwidth; and in response to detecting a check error occurs in the second group of bits, determining a bandwidth from the at least one candidate bandwidth for communication between the first device and the second device based on the first group of bits, wherein the determining a bandwidth for communication between the first device and the second device based on the first group of bits comprises:

in response to determining that the first group of bits indicate a plurality of candidate bandwidths, determining the bandwidth for communication from the plurality of candidate bandwidths based on a bandwidth negotiation process between the first device and the second device, wherein the determining the bandwidth for communication from the plurality of candidate bandwidths comprises:

in response to determining that the bandwidth negotiation process is a dynamic bandwidth negotiation process, selecting a smallest candidate bandwidth from the plurality of candidate bandwidths that correspond to a same group of bits in the scrambling sequence of the PPDU.

2. The method according to claim 1, wherein the determining a bandwidth for communication between the first device and the second device based on the first group of bits comprises:

in response to determining that the first group of bits indicate a single candidate bandwidth, determining the single candidate bandwidth as the bandwidth for communication.

3. The method according to claim 1, wherein the determining a bandwidth for communication between the first device and the second device based on the first group of bits comprises:

in response to determining that a value of the first group of bits is 1, determining the bandwidth for communication as a first bandwidth;

in response to determining that the value of the first group of bits is 2, determining the bandwidth for communication as a second bandwidth; or in response to determining that the value of the first group of bits is 3, determining the bandwidth for communication as a third bandwidth.

4. The method according to claim 3, wherein the first bandwidth is 40 MHz, the second bandwidth is 80 MHz, and the third bandwidth is 160 MHz.

5. The method according to claim 1, wherein the determining the bandwidth for communication from the plurality of candidate bandwidths comprises:

in response to determining that the bandwidth negotiation process is a non-dynamic bandwidth negotiation process, determining the bandwidth for communication from the plurality of candidate bandwidths through blind detection, wherein the non-dynamic bandwidth negotiation process comprises a static bandwidth negotiation process or a bandwidth negotiation-free process.

6. The method according to claim 1, wherein the bandwidth negotiation process is determined depending on whether the PPDU indicates a preset parameter or based on a value of a preset parameter indicated by the PPDU.

7. The method according to claim 1, wherein the PPDU is a PPDU in a non-high throughput (non-HT) format or a PPDU in a non-HT duplicated format.

8. The method according to claim 1, wherein the PPDU carries a power-saving poll (PS-Poll) frame.

9. An apparatus, applied for a first device, comprising:

at least one processor; and one or more memories coupled to the at least one processor and storing instructions for execution by the at least one processor to perform operations comprising:

receiving, a physical layer protocol data unit (PPDU) from a second device, wherein the PPDU comprises a scrambling sequence and a service field, and a first group of bits in the scrambling sequence and a second group of bits in the service field indicate at least one candidate bandwidth; and in response to detecting a check error occurs in the second group of bits, determining a bandwidth from the at least one candidate bandwidth for communication between the apparatus and the second device based on the first group of bits, wherein the determining a bandwidth for communication between the apparatus and the second device based on the first group of bits comprises:

in response to determining that the first group of bits indicate a plurality of candidate bandwidths, determining the bandwidth for communication from the plurality of candidate bandwidths based on a bandwidth negotiation process between the apparatus and the second device, wherein the determining the bandwidth for communication from the plurality of candidate bandwidths comprises:

in response to determining that the bandwidth negotiation process is a dynamic bandwidth negotiation process, selecting a smallest candidate bandwidth from the plurality of candidate bandwidths that correspond to a same group of bits in the scrambling sequence of the PPDU.

10. The apparatus according to claim 9, wherein the determining a bandwidth for communication between the apparatus and the second device based on the first group of bits comprises:

in response to determining that the first group of bits indicate a single candidate bandwidth, determining the single candidate bandwidth as the bandwidth for communication.

11. The apparatus according to claim 9, wherein the determining a bandwidth for communication between the apparatus and the second device based on the first group of bits comprises:

in response to determining that a value of the first group of bits is 1, determining the bandwidth for communication as a first bandwidth;

in response to determining that the value of the first group of bits is 2, determining the bandwidth for communication as a second bandwidth; or in response to determining that the value of the first group of bits is 3, determining the bandwidth for communication as a third bandwidth.

12. The apparatus according to claim 11, wherein the first bandwidth is 40 MHz, the second bandwidth is 80 MHz, and the third bandwidth is 160 MHz.

13. The apparatus according to claim 9, wherein the determining the bandwidth for communication from the plurality of candidate bandwidths comprises:

in response to determining that the bandwidth negotiation process is a non-dynamic bandwidth negotiation process, determining the bandwidth for communication from the plurality of candidate bandwidths through blind detection, wherein the non-dynamic bandwidth negotiation process comprises a static bandwidth negotiation process or a bandwidth negotiation-free process.

14. The apparatus according to claim 9, wherein the bandwidth negotiation process is determined depending on whether the PPDU indicates a preset parameter or based on a value of a preset parameter indicated by the PPDU.

15. The apparatus according to claim 9, wherein the PPDU is a PPDU in a non-high throughput (non-HT) format or a PPDU in a non-HT duplicated format.

16. The apparatus according to claim 9, wherein the PPDU carries a power-saving poll (PS-Poll) frame.

17. An apparatus, applied for a first device, comprising:

at least one processor; and one or more memories coupled to the at least one processor and storing instructions for execution by the at least one processor to perform operations comprising:

receiving, a physical layer protocol data unit (PPDU) from a second device, wherein the PPDU comprises a group of bits that are associated with a bandwidth and that are in a service field; and in response to detecting a check error occurs in the group of bits, determining a bandwidth for communication between the apparatus and the second device based on a bandwidth negotiation process between the apparatus and the second device, wherein the determining a bandwidth for communication between the apparatus and the second device comprises:

in response to determining that the bandwidth negotiation process is a dynamic bandwidth negotiation process, determining a preset bandwidth of 20 MHz as the bandwidth for communication.

18. The apparatus according to claim 17, wherein the bandwidth negotiation process is determined depending on whether the PPDU indicates a preset parameter or based on a value of a preset parameter indicated by the PPDU.

19. The apparatus according to claim 17, wherein the PPDU is a PPDU in a non-high throughput (non-HT) format or a PPDU in a non-HT duplicated format.

20. The apparatus according to claim 17, wherein the PPDU carries a power-saving poll (PS-Poll) frame.

* * * * *